(12) United States Patent
Ochiai et al.

(10) Patent No.: US 8,538,230 B2
(45) Date of Patent: Sep. 17, 2013

(54) RESIN COMPOSITION FOR PRODUCTION OF CLAD LAYER, RESIN FILM FOR PRODUCTION OF CLAD LAYER UTILIZING THE RESIN COMPOSITION, AND OPTICAL WAVEGUIDE AND OPTICAL MODULE EACH UTILIZING THE RESIN COMPOSITION OR THE RESIN FILM

(75) Inventors: Masami Ochiai, Ibaraki (JP); Tatsuya Makino, Ibaraki (JP); Toshihiko Takasaki, Ibaraki (JP); Atsushi Takahashi, Ibaraki (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 354 days.

(21) Appl. No.: 12/864,341

(22) PCT Filed: Jan. 23, 2009

(86) PCT No.: PCT/JP2009/051050
§ 371 (c)(1),
(2), (4) Date: Oct. 19, 2010

(87) PCT Pub. No.: WO2009/093679
PCT Pub. Date: Jul. 30, 2009

(65) Prior Publication Data
US 2011/0033161 A1 Feb. 10, 2011

(30) Foreign Application Priority Data
Jan. 24, 2008 (JP) .................................. 2008-014287

(51) Int. Cl.
*G02B 6/00* (2006.01)
(52) U.S. Cl.
USPC ............................ 385/145; 385/141; 385/144
(58) Field of Classification Search
USPC .......................................................... 385/145
See application file for complete search history.

(56) References Cited

U.S. PATENT DOCUMENTS

| 4,608,400 | A  | * | 8/1986  | Yokoshima et al. | ............ 522/96 |
| 5,204,223 | A  | * | 4/1993  | Taguchi et al.    | ............ 430/281.1 |
| 7,295,749 | B2 | * | 11/2007 | Kitamura et al.   | ............. 385/141 |
| 7,751,678 | B2 | * | 7/2010  | Shibata et al.    | ................ 385/141 |
| 2002/0000287 | A1 | * | 1/2002 | Maruyama et al.  | ........... 156/239 |
| 2002/0001109 | A1 | * | 1/2002 | Hamano et al.    | ................... 359/9 |
| 2002/0015897 | A1 | * | 2/2002 | Toshine et al.    | .................... 430/2 |
| 2007/0081782 | A1 |   | 4/2007 | Maeda et al.     | |
| 2008/0031579 | A1 |   | 2/2008 | Enami et al.     | |
| 2008/0193094 | A1 |   | 8/2008 | Enami et al.     | |
| 2008/0260341 | A1 | * | 10/2008 | Shibata et al.  | ................ 385/129 |
| 2009/0196562 | A1 |   | 8/2009 | Ishida et al.    | |

FOREIGN PATENT DOCUMENTS

| EP | 1 901 097 A1 | 3/2008 |
| JP | 2005-139345 | 6/2005 |
| JP | 2006-2129 | 1/2006 |
| JP | 2006-234852 | 9/2006 |

(Continued)

*Primary Examiner* — Rhonda Peace
(74) *Attorney, Agent, or Firm* — Antonelli, Terry, Stout & Kraus, LLP.

(57) ABSTRACT

The present invention provides a resin composition and film for forming a cladding layer of an optical waveguide, which composition contains (A) a (meth)acrylic polymer having a weight average molecular weight more than 100,000, (B) a urethane (meth)acrylate, and (D) a radical polymerization initiator; and an optical waveguide and an optical module produced by use of the composition or film. There can be provided a resin composition for forming a cladding layer and a resin film for forming a cladding layer, which exhibit excellent bending durability and twisting durability, and an optical waveguide and an optical module each produced therefrom.

26 Claims, 1 Drawing Sheet

(56) References Cited

FOREIGN PATENT DOCUMENTS

| JP | 2007-122023 | 5/2007 |
| JP | 2007-128028 | 5/2007 |
| WO | WO 2006/001452 A1 | 1/2006 |
| WO | WO 2006038691 A1 * | 4/2006 |
| WO | WO 2007/004575 A1 | 1/2007 |
| WO | WO 2007/125740 A1 | 11/2007 |

* cited by examiner

RESIN COMPOSITION FOR PRODUCTION OF CLAD LAYER, RESIN FILM FOR PRODUCTION OF CLAD LAYER UTILIZING THE RESIN COMPOSITION, AND OPTICAL WAVEGUIDE AND OPTICAL MODULE EACH UTILIZING THE RESIN COMPOSITION OR THE RESIN FILM

TECHNICAL FIELD

The present invention relates to a resin composition for forming a cladding layer, to a resin film for forming a cladding layer, and to an optical waveguide and an optical module each employing the composition or the film.

BACKGROUND ART

In high-speed and high-density signal transmission between electronic devices or between wiring boards, signal transmission through conventional electric wiring suffers problems of inter-signal interference or signal attenuation, which limit the speed and density of signal transmission. In order to solve the limitation-related problem, studies have been conducted on a technique of optical connection between electronic devices or between wiring boards; i.e., optical inter-connection.

For transmitting an optical signal over a short distance within a device or between devices, a flexible film optical waveguide is required. Particularly when an optical waveguide is mounted in a small portable device, the optical waveguide is often mounted along the surface of a part of the device for saving space. Therefore, there is demand for a polymer-film optical waveguide which can be bent with a small radius of curvature.

In order to enhance the bending property of a flexible optical waveguide or the followability of the interface between layers during restoration of the optical waveguide, optical waveguides employing low-elastic-modulus material were previously developed. For example, Patent Document 1 discloses that the bending property of an optical waveguide is enhanced through use of a cladding layer thereof formed of an elastomer exhibiting a bending elastic modulus of 1,000 MPa or less after curing. Patent Document 2 discloses that a film optical waveguide in which cladding layers are joined by the mediation of a resin exhibiting a bending elastic modulus of 1,000 MPa or less and whose precursor has a hydrogen-bond group as a functional group exhibits enhanced followability of the interface between layers during bending or restoration of the optical waveguide. Particularly when a film optical waveguide which has upper and lower cladding layers each formed of an elastomer having a bending elastic modulus of 200 MPa and in which the cladding layer are joined by the mediation of a resin exhibiting a bending elastic modulus of 1,000 MPa or less and whose precursor has a hydrogen-bond group as a functional group is employed as a hinge of a mobile phone, bending with a radius of curvature as small as 1 mm is possible, and no peeling at the interface occurs after 200,000 repetitions of bending. However, since the optical waveguides disclosed in Patent Documents 1 and 2 are produced by means of a stamper, the freedom of design is limited, and change of the design is difficult, which are problematic. In Patent Documents 1 and 2, bending durability thereof is not studied in detail.

Patent Document 3 discloses a film-type optical waveguide which is produced from a photosensitive resin composition containing a (meth)acrylic polymer and a urethane (meth)acrylate compound and which exhibits a transmission loss of 0.5 dB/cm or less and excellent bending resistance. Regarding the (meth)acrylic polymer, Patent Document 3 discloses that when the weight average molecular weight exceeds 100,000, the viscosity of the composition increases, to impair coatability of the composition, which is problematic. In the Examples in Patent Document 3, (meth)acrylic polymers having a weight average molecular weight of 18,000 to 35,500 are employed, and bending resistance is evaluated by observing cracking or breakage of an optical waveguide when it is wound over a metallic rod having a radius of 2 mm. However, no description is provided on bending durability. When an optical waveguide is employed as a hinge of a mobile phone, twisting durability may be required in addition to bending durability. However, hitherto, no study has been conducted on twisting durability, and there has not been developed an optical waveguide exhibiting satisfactory bending durability and twisting durability.

Patent Document 1: Japanese Patent No. 3906870
Patent Document 2: Japanese Patent No. 3870976
Patent Document 3: Japanese Patent Application Laid-Open No. 2007-122023

DISCLOSURE OF THE INVENTION

In order to solve the problems in the aforementioned techniques, objects of the present invention are to provide a resin composition for forming a cladding layer that is excellent in both bending durability and twisting durability; to provide a resin film for forming such a cladding layer; and to provide an optical waveguide and an optical module produced from the resin composition or film.

The present inventors have carried out extensive studies, and have found that the aforementioned problems can be solved by producing an optical waveguide from a resin composition for forming a cladding layer, which composition comprises (A) a (meth)acrylic polymer having a weight average molecular weight more than 100,000, (B) a urethane (meth)acrylate, and (D) a radical polymerization initiator.

Accordingly, the present invention provides the following:

a resin composition for forming a cladding layer of an optical waveguide, which composition comprises (A) a (meth)acrylic polymer having a weight average molecular weight more than 100,000, (B) a urethane (meth)acrylate, and (D) a radical polymerization initiator;

a resin film for forming a cladding layer employing the resin composition for forming a cladding layer;

an optical waveguide having a lower cladding layer and an upper cladding layer, at least one of which is formed by use of the resin composition for forming a cladding layer or the resin film for forming a cladding layer; and an optical module employing the optical waveguide.

According to the present invention, there can be provided a resin composition for forming a cladding layer that is excellent in both bending durability and twisting durability, a resin film for forming a cladding layer, and an optical waveguide and an optical module each produced the resin composition or film.

DESCRIPTION OF THE REFERENCE NUMERALS

Figure 1:
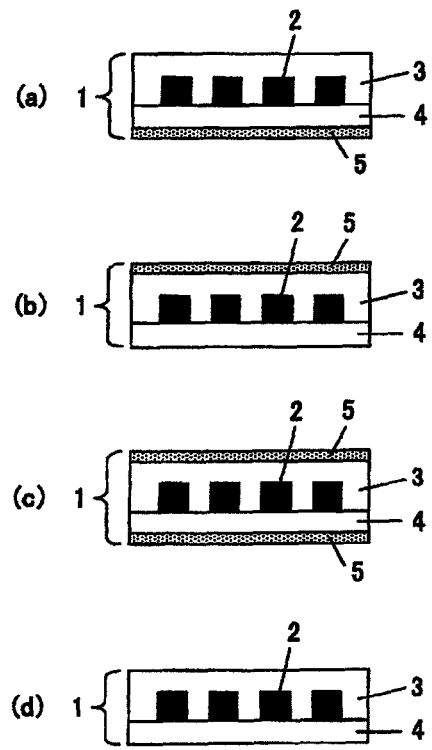
FIG. 1 Cross-sections showing an embodiment of the optical waveguide of the present invention.

1. Optical waveguide
2. Core portion
3. Upper cladding layer (second cladding layer)
4. Lower cladding layer (first cladding layer)
5. Base
6. Cured film of resin composition for forming a cladding layer
7. Bending axis (imaginary axis)

BEST MODES FOR CARRYING OUT THE INVENTION

Hereinafter, the present invention will be described in more detail.

The resin composition for forming a cladding layer of the present invention comprises (A) a (meth)acrylic polymer having a weight average molecular weight more than 100,000, (B) a urethane (meth)acrylate, and (D) a radical polymerization initiator. Hereinafter, component (A) may be referred to simply as "(A) (meth)acrylic polymer."

The components will be described in more detail.

The (meth)acrylic polymer, serving as component (A) of the present invention, refers to a polymer formed through polymerization of a monomer selected from among acrylic acid, acrylic acid ester, methacrylic acid, methacrylic acid ester, and a derivative thereof. The (meth)acrylic polymer may be a homopolymer of any of the aforementioned monomers or a copolymer of two or more monomers selected the aforementioned monomers. So long as the effects of the present invention are not impaired, the (meth)acrylic polymer may be a copolymer formed from the aforementioned monomers and a monomer other than the aforementioned monomers. The (meth)acrylic polymer may be a mixture of a plurality of (meth)acrylic polymers.

The weight average molecular weight of the (meth)acrylic polymer (A) is more than 100,000, preferably more than 100,000 and 3,000,000 or less, more preferably more than 100,000 and 2,000,000 or less, particularly preferably more than 100,000 and 1,500,000 or less. When the weight average molecular weight in more than 100,000, sheets and films formed therefrom exhibit sufficient strength and flexibility, and an increase in tackiness is prevented. When the molecular weight is 3,000,000 or less, good compatibility with urethane (meth)acrylate or a monomer is attained, and sufficient flowability is ensured to prevent reduction of core covering property. In the present invention, the "weight average molecular weight" refers to such a molecular weight determined through gel permeation chromatography and reduced by use of a standard polystyrene calibration curve.

The (meth)acrylic polymer (A) having a weight average molecular weight more than 100,000 preferably has a reactive functional group. Examples of preferred reactive functional groups include an epoxy group, a carboxyl group, a hydroxyl group, an episulfido group, an aldehyde group, an amido group, a vinyl group, an amino group, an isocyanate group, a (meth)acryloyl group, or an allyl group. Of these, an epoxy group and a (meth)acryloyl group are preferred from the viewpoint of cross-linkability. Specific examples include an epoxy-group-containing (meth)acrylic polymer which is formed from an ethylenic unsaturated epoxide as a starting monomer and which has a weight average molecular weight more than 100,000; and a (meth)acryl-group-containing (meth)acrylic polymer which is produced through reaction of the epoxy group of the aforementioned polymer with (meth)acrylic acid and which has a weight average molecular weight more than 100,000.

Among such (meth)acrylic polymers, (meth)acrylate ester copolymers, acrylic rubber, and the like may be used. Of these, acrylic rubber is more preferred. Acrylic rubber is produced from an acrylic acid ester as a primary component and is predominantly of a butyl acrylate-acrylonitrile-based copolymer, an ethyl acrylate-acrylonitrile-based copolymer, etc.

Examples of the co-monomer include butyl (meth)acrylate, propyl (meth)acrylate, ethyl (meth)acrylate, methyl (meth)acrylate, and acrylonitrile.

In the case an epoxy group is selected as the reactive functional group, an ethylenic unsaturated epoxide is preferably employed as a co-monomer.

No particular limitation is imposed on the ethylenic unsaturated epoxide, and examples thereof include glycidyl (meth)acrylate, α-ethylglycidyl (meth)acrylate, α-propylglycidyl (meth)acrylate, α-butylglycidyl (meth)acrylate, 2-methylglycidyl (meth)acrylate, 2-ethylglycidyl (meth)acrylate, 2-propylglycidyl (meth)acrylate, 3,4-epoxybutyl (meth)acrylate, 3,4-epoxyheptyl (meth)acrylate, α-ethyl-6,7-epoxyheptyl (meth)acrylate, o-vinylbenzylglycidyl ether, m-vinylbenzylglycidyl ether, p-vinylbenzylglycidyl ether, 3,4-epoxycyclohexylmethyl (meth)acrylate, 3,4-epoxycyclohexylethyl (meth)acrylate, 3,4-epoxycyclohexylpropyl (meth)acrylate, and 3,4-epoxycyclohexylbutyl (meth)acrylate. Among them, glycidyl (meth)acrylate, 3,4-epoxybutyl (meth)acrylate, 3,4-epoxycyclohexylmethyl (meth)acrylate, and 3,4-epoxycyclohexylethyl (meth)acrylate are preferred, from the viewpoints of transparency and heat resistance.

Such an epoxy-group-containing (meth)acrylic polymer may be produced from appropriate monomers selected from the aforementioned monomers, or commercial available products (HTR-860P-3, HTR-860P-5, etc., products of Nagase ChemteX Corporation).

In the (meth)acrylic polymer (A) having a weight average molecular weight more than 100,000, the cross-linking density of the cured product depends on the number of reactive functional groups. Thus, in the case where the (meth)acrylic polymer is produced as a copolymer from a plurality of monomers, the reactive-functional group-containing monomer is preferably contained in the copolymer in an amount of 0.5 to 20 mass %, depending on the type of the resin.

In the case where an epoxy group-containing (meth)acrylic polymer is employed as component (A), the amount of ethylenic unsaturated epoxide serving as a raw material is 0.5 to 20 mass % with respect to the copolymer, preferably 0.5 to 18 mass %, particularly preferably 0.8 to 15 mass %. When the total amount of epoxy group-containing repeating units falls within the range, cross-linking of epoxy groups gradually occurs. Thus, a cured film having such an appropriate elastic modulus that the film can pass a folding-type bending durability test, a twisting durability test, a slide-type bending durability test, etc.

Alternatively, a monomer formed through incorporating another functional group into the ethylenic unsaturated epoxide may also be employed. The amount of such a modified monomer in the copolymer is selected in consideration of the glass transition temperature (hereinafter abbreviated as "Tg") of the epoxy group-containing (meth)acrylic polymer. The Tg is preferably −30° C. or more. When the Tg is −30° C. or more, the resin film for forming a cladding layer has an appropriate tackiness, causing no problem in handling.

In the case where an epoxy group-containing (meth)acrylic polymer produced through polymerization of the aforementioned monomers is employed as the (meth)acrylic polymer (A) having a weight average molecular weight more than 100,000, no particular limitation is imposed on the method of polymerization, and a polymerization method such as pearl polymerization or solution polymerization may be employed.

The (meth)acryloyl-group-containing (meth)acrylic polymer, serving as component (A) may be produced through, for example, addition of an ethylenic unsaturated carboxylic acid to a side-epoxy group of the epoxy group-containing (meth)acrylic polymer. Examples of the ethylenic unsaturated carboxylic acid include (meth)acrylic acid, crotonic acid, cinnamic acid, maleic acid, fumaric acid, citraconic acid, methaconic acid, itaconic acid, mono(2-(meth)acryloyloxy-ethyl)succinate, mono(2-(meth)acryloyloxyethyl)phthalate, mono(2-(meth)acryloyloxyethyl)isophthalate, mono(2-(meth)acryloyloxyethyl)terephthalate, mono(2-(meth)acryloyloxyethyl)tetrahydrophthalate, mono(2-(meth)acryloyloxyethyl)hexahydrophthalate, mono(2-(meth)acryloyloxyethyl)hexahydroisophthalate, mono(2-(meth)acryloyloxyethyl)hexahydroterephthalate, ω-carboxy-polycaprolactone mono(meth)acrylate, o-vinylbenzoic acid, m-vinylbenzoic acid, and p-vinylbenzoic acid. Of these, (meth)acrylic acid is preferred from the viewpoints of ease of synthesis and cross-linkability.

The (meth)acryl group content of component (A) is preferably 0.5 to 20 mass %, more preferably 0.5 to 18 mass %, particularly preferably 0.8 to 15 mass %. When the total amount of (meth)acryloyl-group-containing repeating units falls within the range, cross-linking of epoxy groups gradually occurs. Thus, a cured film having such an appropriate elastic modulus that the film can pass a folding-type bending durability test, a twisting durability test, a slide-type bending durability test, etc.

In the present invention, no particular limitation is imposed the urethane (meth)acrylate (B), and a known urethane (meth)acrylate, for example, a urethane (meth)acrylate produced through reaction between a hydroxyl-group-containing (meth)acrylate and a polyisocyanate or through reaction among a hydroxyl-group-containing (meth)acrylate, a polyisocyanate, and a polyol may be employed. Urethane (meth)acrylate produced through reaction between a hydroxyl-group-containing (meth)acrylate and a polyisocyanate is preferred from the viewpoint of compatibility with (meth)acrylic polymer.

As used herein, the term "(meth)acrylate" refers to acrylate or methacrylate. The term "acrylate" refers to a compound having an acryloyl group, and the term "methacrylate" refers to a compound having a methacryloyl group.

Examples of the urethane (meth)acrylate produced through reaction between a hydroxyl-group-containing (meth)acrylate and a polyisocyanate include a reaction product of hydroxyethyl (meth)acrylate with 2,5- or 2,6-bis(isocyanatomethyl)-bicyclo[2.2.1]heptane; a reaction product of hydroxyethyl (meth)acrylate with 2,4-tolylene diisocyanate; a reaction product of hydroxyethyl (meth)acrylate with isophorone diisocyanate; a reaction product of hydroxypropyl (meth)acrylate with 2,4-tolylene diisocyanate; a reaction product of hydroxypropyl (meth)acrylate with isophorone diisocyanate; a reaction product of phenylglycidyl ether (meth)acrylate with hexamethylene diisocyanate; a reaction product of phenylglycidyl ether with toluene diisocyanate; a reaction product of pentaerythritol tri(meth)acrylate with hexamethylene diisocyanate; a reaction product of pentaerythritol tri(meth)acrylate with toluene diisocyanate; a reaction product of pentaerythritol tri(meth)acrylate with isophorone diisocyanate; and a reaction product of dipentaerythritol penta(meth)acrylate with hexamethylene diisocyanate.

Examples of the polyol for producing a urethane (meth)acrylate through reaction among a hydroxyl-group-containing (meth)acrylate, a polyisocyanate, and a polyol include polyether diol, polyester diol, polycarbonate diol, and polycaprolactone diol.

Polyether diol includes aliphatic, alicyclic, and aromatic polyether diols.

These polyols may be used singly or in combination of two or more species.

Also, there may be employed a polyol having a valency of 2 or more which is synthesized through reaction between a diol and a polyisocyanate.

No particular limitation is imposed on the format of polymerization of these structural units, and any of random polymerization, block polymerization, and graft polymerization may be employed.

Examples of the aliphatic polyether diol include polyethylene glycol, polypropylene glycol, polytetramethylene glycol, polyhexamethylene glycol, polyheptamethylene glycol, polydecamethylene glycol, and a polyether diol formed through ring-opening copolymerization of two or more ionic-polymerizable cyclic compound species.

Examples of the ionic-polymerizable cyclic compound include cyclic ethers such as ethylene oxide, propylene oxide, butene-1-oxide, isobutene oxide, 3,3-bischloromethyloxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, allylglycidyl ether, allylglycidyl carbonate, butadiene monooxide, isoprene monooxide, vinyloxetane, vinyltetrahydrofuran, vinylcyclohexene oxide, phenylglycidyl ether, butylglycidyl ether, and glycidyl benzoate.

Specific examples of the polyether diol formed through ring-opening copolymerization of two or more ionic-polymerizable cyclic compound species include copolymers of two components such as tetrahydrofuran and propylene oxide, tetrahydrofuran and 2-methyltetrahydrofuran, tetrahydrofuran and 3-methyltetrahydrofuran, tetrahydrofuran and ethylene oxide, propylene oxide and ethylene oxide, and butene-1-oxide and ethylene oxide; and terpolymers of tetrahydrofuran, butene-1-oxide, and ethylene oxide.

There may also be employed polyether diols formed through ring-opening copolymerization of the aforementioned ionic-polymerizable cyclic compound with a cyclic imine (e.g., ethyleneimine), with a cyclic lactonic acid (e.g., β-propiolactone or a glycolic acid lactide), and with a dimethylcyclopolysiloxane.

Examples of the alicyclic polyether diol include hydrogenated bisphenol A alkylene oxide adduct diol, hydrogenated bisphenol F alkylene oxide adduct diol, and 1,4-cyclohexane diol alkylene oxide adduct diol.

If needed, the resin composition for forming a cladding layer of the present invention may further contain (C) a (meth)acrylate having no urethane bond in the molecule thereof. Hereinafter, component (C) may be referred to simply as "(C) (meth)acrylic polymer."

No particular limitation is imposed on the (meth)acrylate (C), and any of mono-, bi-, and ≧3-functional (meth)acrylates may be employed.

No particular limitation is imposed on the mono-functional (meth)acrylate, and examples thereof include aliphatic (meth)acrylates such as methyl (meth)acrylate, ethyl (meth)acrylate, propyl (meth)acrylate, isopropyl (meth)acrylate, butyl (meth)acrylate, isobutyl (meth)acrylate, sec-butyl (meth)acrylate, tert-butyl (meth)acrylate, butoxyethyl (meth)

acrylate, pentyl (meth)acrylate, hexyl (meth)acrylate, 2-ethylhexyl (meth)acrylate, heptyl (meth)acrylate, octyl (meth)acrylate, nonyl (meth)acrylate, decyl (meth)acrylate, undecyl (meth)acrylate, lauryl (meth)acrylate, tridecyl (meth)acrylate, tetradecyl (meth)acrylate, pentadecyl (meth)acrylate, hexadecyl (meth)acrylate, stearyl (meth)acrylate, behenyl (meth)acrylate, 2-hydroxyethyl, (meth)acrylate, 2-hydroxypropyl (meth)acrylate, 3-chloro-2-hydroxypropyl (meth)acrylate, and 2-hydroxybutyl (meth)acrylate; alicyclic (meth)acrylates such as cyclopentyl (meth)acrylate, cyclohexyl (meth)acrylate, cyclopentyl (meth)acrylate, dicyclopentanyl (meth)acrylate, dicyclopentenyl (meth)acrylate, and isobornyl (meth)acrylate; aromatic (meth)acrylates such as phenyl (meth)acrylate, nonylphenyl (meth)acrylate, p-cumylphenyl (meth)acrylate, o-biphenyl (meth)acrylate, 1-naphthyl (meth)acrylate, 2-naphthyl (meth)acrylate, benzyl (meth)acrylate, 2-hydroxy-3-phenoxypropyl (meth)acrylate, 2-hydroxy-3-(o-phenylphenoxy)propyl (meth)acrylate, 2-hydroxy-3-(1-naphthoxy)propyl (meth)acrylate, 2-hydroxy-3-(2-naphthoxy)propyl (meth)acrylate, and phenoxyethyl (meth)acrylate; heterocyclic (meth)acrylates such as 2-tetrahydrofurfuryl (meth)acrylate, N-(meth)acryloyloxyethylhexahydrophthalimide, and 2-(meth)acryloyloxyethyl-N-carbazole; ethoxylated forms thereof; propoxylated forms thereof; ethoxylated propoxylated forms thereof; and caprolactone-modified forms thereof. Examples of the carboxylic-acid-containing (meth)acrylate include 2-acryloyloxyethyl succinate and 2-acryloyloxyethyl phthalate.

The aforementioned ethoxylated forms thereof, propoxylated forms thereof, and ethoxylated propoxylated forms thereof respectively refer to (meth)acrylates produced from an alcohol in which ethylene oxide is added to an alcoholic or phenolic hydroxyl group; (meth)acrylates produced from an alcohol in which propylene oxide is added to an alcoholic or phenolic hydroxyl group; and (meth)acrylates produced from an alcohol in which ethylene oxide and propylene oxide are added to an alcoholic or phenolic hydroxyl group. For example, ethoxylated phenoxyethyl (meth)acrylate refers to a (meth)acrylate produced through reaction between ethylene-oxide-added phenoxyethyl alcohol and acrylic acid or methacrylic acid.

No particular limitation is imposed on the bi-functional (meth)acrylate, and examples thereof include aliphatic (meth)acrylates such as ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, dipropylene glycol di(meth)acrylate, tripropylene glycol di(meth)acrylate, tetrapropylene glycol di(meth)acrylate, polypropylene glycol di(meth)acrylate, 1,3-butanediol di(meth)acrylate, 2-methyl-1,3-propanediol di(meth)acrylate, 1,4-butanediol di(meth)acrylate, neopentyl glycol di(meth)acrylate, 3-methyl-1,5-pentanediol di(meth)acrylate, 1,6-hexanediol di(meth)acrylate, 2-butyl-2-ethyl-1,3-propanediol di(meth)acrylate, 1,9-nonanediol di(meth)acrylate, 1,10-decanediol di(meth)acrylate, glycerin di(meth)acrylate, and tricyclodecanedimethanol (meth)acrylate; alicyclic (meth)acrylates such as cyclohexanedimethanol (meth)acrylate, ethoxylated cyclohexanedimethanol (meth)acrylate, tricyclodecanedimethanol (meth)acrylate, hydrogenated bisphenol A di(meth)acrylate, and hydrogenated bisphenol F di(meth)acrylate; aromatic (meth)acrylates such as bisphenol A di(meth)acrylate, bisphenol F di(meth)acrylate, bisphenol AF di(meth)acrylate, and fluorene di(meth)acrylate; heterocyclic (meth)acrylates such as isocyanuric acid di(meth)acrylate; ethoxylated forms thereof; propoxylated forms thereof; ethoxylated propoxylated forms thereof; caprolactone-modified forms thereof; aliphatic epoxy (meth)acrylates such as neopentyl glycol epoxy (meth)acrylate; alicyclic epoxy (meth)acrylates such as cyclohexanedimethanol epoxy (meth)acrylate, hydrogenated bisphenol A epoxy (meth)acrylate, and hydrogenated bisphenol F epoxy (meth)acrylate; and aromatic epoxy (meth)acrylates such as resorcinol epoxy (meth)acrylate, bisphenol A epoxy (meth)acrylate, bisphenol F epoxy (meth)acrylate, bisphenol AF epoxy (meth)acrylate, and fluorene epoxy (meth)acrylate.

No particular limitation is imposed on the functional (meth)acrylate, and examples thereof include aliphatic (meth)acrylates such as trimethylolpropane tri(meth)acrylate, pentaerythritol tri(meth)acrylate, dipentaerythritol hexa(meth)acrylate, ditrimethylolpropane tetra(meth)acrylate, pentaerythritol tetra(meth)acrylate, dipentaerythritol penta(meth)acrylate, and dipentaerythritol hexa(meth)acrylate; heterocyclic (meth)acrylates such as isocyanuric acid tri(meth)acrylate; ethoxylated forms thereof; propoxylated forms thereof; ethoxylated propoxylated forms thereof; caprolactone-modified forms thereof; aromatic epoxy (meth)acrylates such as phenol novolak epoxy (meth)acrylate and cresol novolak epoxy (meth)acrylate. Examples of the carboxylic-acid-containing (meth)acrylate include 2,2,2-trisacryloyloxymethylethyl succinate.

From the viewpoints of prevention of swelling during development, transparency, and compatibility with (meth)acrylic polymer, the resin composition preferably contains a resin or monomer having three or more (meth)acryloyl groups in the molecule thereof. Specific examples include Light Acrylate DPE-6A (product of KYOEISHA CHEMICAL Co., Ltd.) and NK Ester A-9300 (product of Shin-Nakamura Chemical Co., Ltd.). Use of a carboxylic-acid-containing (meth)acrylate is preferred, since the epoxy group of the (meth)acrylic polymer (A) is reacted with (meth)acryloyl groups of (B) and (C), whereby satisfactory compatibility of cured products, curability, transparency, and bending property can be attained. Specific examples of the carboxylic-acid-containing (meth)acrylate include NK Ester CBX-0 (product of Shin-Nakamura Chemical Co., Ltd.).

These compounds may be used singly or in combination of two or more species.

Preferably, the resin composition of the present invention contains (B) a urethane (meth)acrylate and (C) a (meth)acrylate in a total amount of 10 to 200 parts by mass with respect to 100 parts by mass of (A) a (meth)acrylic polymer. Through addition of components (B) and (C), curing reaction sufficiently proceeds, whereby solvent resistance and peelability from a supporting base tend to be enhanced. When the total amount of the components (B) and (C) incorporated into the composition is 200 parts by mass or less, low elastic modulus of the (meth)acrylic polymer is realized, and bending durability and twisting durability are enhanced without rending the film of the polymer to be fragile, which is preferred. Thus, from these viewpoints, the total amount of components (B) and (C) is more preferably 20 to 150 parts by mass with respect to 100 parts by mass of component (A), particularly preferably 40 to 100 parts by mass.

Regarding the amounts of components (B) and (C), the amount of component (C) is preferably 0 to 500 parts by mass with respect to 100 parts by mass of component (B). Through addition of an appropriate amount of component (C), solvent resistance and compatibility with component (A) tend to increase. From this viewpoint, the amount of component (C) is more preferably 10 to 400 parts by mass with respect to 100 parts by mass of component (B), particularly preferably 20 to 300 parts by mass.

No particular limitation is imposed on the radical polymerization initiator (D) employed in the present invention, and examples thereof include a thermal radical polymerization initiator and a photo radical polymerization initiator.

No particular limitation is imposed on the thermal radical polymerization initiator, and examples thereof include ketone peroxides such as methyl ethyl ketone peroxide, cyclohexanone peroxide and methylcyclohexanone peroxideoxide; peroxyketals such as 1,1-bis(t-butylperoxy)cyclohexane, 1,1-bis(t-butylperoxy)-2-methylcyclohexane, 1,1-bis(t-butylperoxy)-3,3,5-trimethylcyclohexane, 1,1-bis(t-hexylperoxy)cyclohexane, and 1,1-bis(t-hexylperoxy)-3,3,5-trimethylcyclohexane; hydroperoxides such as p-menthane hydroperperoxide; dialkyl peroxides such as α, α'-bis(t-butylperoxy) diisopropylbenzene, dicumyl peroxide, t-butyl-cumyl peroxide, and di-t-butyl peroxide; diacyl peroxides such as octanoyl peroxide, lauroyl peroxide, stearyl peroxide, and benzoyl peroxide; peroxycarbonates such as bis(4-t-butylcyclohexyl) peroxydicarbonate, di-2-ethoxyethyl peroxydicarbonate, di-2-ethylhexyl peroxydicarbonate, and di-3-methoxybutyl peroxycarbonate; peroxy esters such as t-butylperoxypyvalate, t-hexylperoxypyvalate, 1,1,3,3-tetramethylbutyl peroxy-2-ethylhexanoate, 2,5-dimethyl-2,5-bis(2-ethylhexanoylperoxy)hexane, t-hexyl peroxy-2-ethylhexanoate, t-butyl peroxy-2-ethylhexanoate, t-butyl peroxyisobutylate, t-hexyl peroxyisopropylmonocarbonate, t-butyl peroxy-3,5,5-trimethylhexanoate, t-butyl peroxylaurylate, t-butyl peroxyisopropylmonocarbonate, t-butyl peroxy-2-ethylhexylmonocarbonate, t-butyl peroxybenzoate, t-hexyl peroxybenzoate, 2,5-dimethyl-2,5-bis(benzolyperoxy)hexane, and t-butyl peroxyacetate; and azo compounds such as 2,2'-azobisisobutyronitrile, 2,2'-azobis(2,4-dimethylvaleronitrile), and 2,2'-azobis(4-methoxy-2'-dimethylvaleronitrile).

Among them, diacyl peroxides, peroxy esters, and azo compounds are preferred from the viewpoints of curability and transparency.

No particular limitation is imposed on the photo radical polymerization initiator, and examples thereof include benzoin ketals such as 2,2-dimethoxy-1,2-diphenylethan-1-one; α-hydroxyketones such as 1-hydroxycyclohexyl phenyl ketone, 2-hydroxy-2-methyl-1-phenylpropane-1-one, 1-[4-(2-hydroxyethoxy)phenyl]-2-hydroxy-2-methyl-1-propane-1-one, and 2-hydroxy-1-{4[4-(2-hydroxy-2-methylpropionyl)benzyl]phenyl}-2-methylpropane-1-one; glyoxy esters such as methyl phenylglyoxylate, ethyl phenylglyoxylate, 2-(2-hydroxyethoxy)ethyl oxyphenylacetate, and 2-(2-oxo-2-phenylacetoxyethoxy)ethyl oxyphenylacetate; α-aminoketones such as 2-benzyl-2-dimethylamino-1-(4-morpholin-4-ylphenyl)-butan-1-one, 2-dimethylamino-2-(4-methylbenzyl)-1-(4-morpholin-4-ylphenyl)-butan-1-one, and 1,2-methyl-1-[4-(methylthio)phenyl]-(4-morpholin)-2-ylpropane-1-one; oxime esters such as 1,2-octanedione, 1-[4-(phenylthio), 2-(O-benzoyloxime)] and ethanone, 1-[9-ethyl-6-(2-methylbenzoyl)-9H-carbazol-3-yl], 1-(O-acetyloxime); phosphine oxides such as bis(2,4,6-trimethylbenzoyl)phenylphosphine oxide, bis(2,6-dimethoxybenzoyl)-2,4,4-trimethylpentylphosphine oxide, and 2,4,6-trimethylbenzoyldiphenylphosphine oxide; 2,4,5-triarylimidazole dimers such as 2-(o-chlorophenyl)-4,5-diphenylimidazole dimer, 2-(o-chlorophenyl)-4,5-di(methoxyphenyl)imidazole dimer, 2-(o-fluorophenyl)-4,5-diphenylimidazole dimer, 2-(o-methoxyphenyl)-4,5-diphenylimidazole dimer, and 2-(p-methoxyphenyl)-4,5-diphenylimidazole dimer; benzophenone compounds such as benzophenone, N,N'-tetramethyl-4,4'-diaminobenzophenone, N,N'-tetraethyl-4,4'-diaminobenzophenone, and 4-methoxy-4'-dimethylaminobenzophenone; quinone compounds such as 2-ethylanthraquinone, phenanthrenequinone, 2-tert-butylanthraquinone, octamethylanthraquinone, 1,2-benzanthraquinone, 2,3-benzanthraquinone, 2-phenylanthraquinone, 2,3-diphenylanthraquinone, 1-chloroanthraquinone, 2-methylanthraquinone, 1,4-naphthoquinone, 9,10-phenanthraquinone, 2-methyl-1,4-naphthoquinone, and 2,3-dimethylanthraquinone; benzoin ethers such as benzoin methyl ether, benzoin ethyl ether, and benzoin phenyl ether; benzoin compounds such as benzoin, methylbenzoin, and ethylbenzoin; benzyl compounds such as benzyl dimethyl ketal; acridine compounds such as 9-phenylacridine and 1,7-bis(9,9'-acridinylheptane); N-phenylglycine; and coumarin.

In the 2,4,5-triarylimidazole dimer, two triarylimidazole moieties may be identical to (i.e., symmetric) or different from (i.e., asymmetric) each other in terms of aryl groups.

Among them, α-hydroxyketones, glyoxyesters, oxime esters, and phosphine oxides are preferred from the viewpoints of curability and transparency.

These thermal and photo radical polymerization initiators may be used singly or in combination of two or more species. Furthermore, these polymerization initiators may be used in combination with an appropriate sensitizer.

The amount of the radical polymerization initiator (D) incorporated into the resin composition is preferably 0.1 to 10 parts by mass, with respect to a total amount of 100 parts by mass of components (A), (B), and (C). When the amount of component (D) is 0.1 parts by mass or more, sufficient curing is attained, whereas when the amount is 10 parts by mass or less, sufficient optical transparency is attained. Thus, from these viewpoints, the amount of the radical polymerization initiator (D) incorporated into the resin composition is more preferably 0.5 to 7 parts by mass, with respect to a total amount of 100 parts by mass of components (A), (B), and (C), particularly preferably 0.8 to 5 parts by mass.

A curing accelerator (E) may be used for reacting an epoxy group of the (meth)acrylic polymer (A) with a carboxyl group of (meth)acrylate (C).

A variety of imidazoles are preferably employed as the curing accelerator (E). Examples of the imidazole include 2-methylimidazole, 2-ethyl-4-methylimidazole, and 1-cyanoethyl-2-phenylimidazole, and specific examples include 2E4MZ, 2PZ, 2PZ-CN, and 2PZ-CNS (products of Shikoku Chemicals Corporation).

The amount of the curing accelerator (E) incorporated into the resin composition is preferably 0.1 to 10 parts by mass, with respect to a total amount of 100 parts by mass of components (A), (B), and (C). When the amount of component (E) is 0.1 parts by mass or more, sufficient curing is attained, whereas when the amount is 10 parts by mass or less, sufficient optical transparency is attained. Thus, from these viewpoints, the amount of the curing accelerator (E) incorporated into the resin composition is more preferably 0.2 to 7 parts by mass, with respect to a total amount of 100 parts by mass of components (A), (B), and (C), particularly preferably 0.5 to 5 parts by mass.

If needed, the resin composition for forming a cladding layer of the present invention may further contain additives such as an anti-oxidant, a yellowing inhibitor, a UV-absorber, a visible-light-absorber, a colorant, a plasticizer, a stabilizer, and a filler, in such amounts that the effects of the present invention are not impaired.

The resin composition for forming a cladding layer of the present invention is preferably employed for forming at least one of the lower and upper cladding layers of the optical waveguide.

The resin composition for forming a cladding layer of the present invention may be diluted with an appropriate organic solvent, to thereby provide a resin varnish for forming a cladding layer. No particular limitation is imposed on the solvent for preparing varnish, so long as the solvent can dissolve the resin composition for forming a cladding layer of the present invention. Examples of the solvent include aromatic hydrocarbons such as toluene, xylene, mesitylene, cumene, and p-cymene; chain ethers such as diethyl ether, tert-butyl methyl ether, cyclopentyl methyl ether, and dibutyl ether; cyclic ethers such as tetrahydrofuran and 1,4-dioxane; alcohols such as methanol, ethanol, isopropanol, butanol, ethylene glycol, and propylene glycol; ketones such as acetone, methyl ethyl ketone, methyl isobutyl ketone, cyclohexanone, and 4-hydroxy-4-methyl-2-pentanone; esters such as methyl acetate, ethyl acetate, butyl acetate, methyl lactate, ethyl lactate, and γ-butyrolactone; carbonate esters such as ethylene carbonate and propylene carbonate; polyhydric alcohol alkyl ethers such as ethylene glycol monomethyl ether, ethylene glycol monoethyl ether, ethylene glycol monobutyl ether, ethylene glycol dimethyl ether, ethylene glycol diethyl ether, propylene glycol monomethyl ether, propylene glycol monoethyl ether, propylene glycol dimethyl ether, propylene glycol diethyl ether, diethylene glycol monomethyl ether, diethylene glycol monoethyl ether, diethylene glycol monobutyl ether, diethylene glycol dimethyl ether, and diethylene glycol diethyl ether; polyhydric alcohol alkyl ether acetates such as ethylene glycol monomethyl ether acetate, ethylene glycol monoethyl ether acetate, ethylene glycol monobutyl ether acetate, propylene glycol monomethyl ether acetate, propylene glycol monoethyl ether acetate, diethylene glycol monomethyl ether acetate, and diethylene glycol monoethyl ether acetate; and amides such as N,N-dimethylformamide, N,N-dimethylacetamide, and N-methylpyrrolidone.

These organic solvents may be used singly or in combination of two or more species. The resin varnish preferably has a solid content of generally 10 to 80 mass %.

For preparing the resin composition for forming a cladding layer of the present invention, the components are preferably mixed under agitation. No particular limitation is imposed on the agitation method, but agitation by means of a propeller is preferred, from the efficiency of agitation. No particular limitation is imposed on the rotation speed of the propeller during agitation, but the rotation speed is preferably 10 to 1,000 rpm. When the rotation speed is 10 rpm or more, the components are sufficiently mixed, whereas when the speed is 1,000 rpm or less, entrainment of air bubbles caused by rotation of the propeller is reduced. From these viewpoints, the rotation speed of the propeller is more preferably 50 to 800 rpm, particularly preferably 100 to 500 rpm.

No particular limitation is imposed on the agitation time, but the time is preferably 1 to 24 hours. When the agitation time is one hour or longer, the components are sufficiently mixed, whereas when the agitation time is 24 hours or shorter, the time required for preparing resin varnish can be shortened, thereby elevating productivity.

The thus-prepared resin composition or resin varnish for forming a cladding layer is preferably defoamed under reduced pressure. No particular limitation is imposed on the defoaming method, and defoaming is performed by means of, for example, a combination of a vacuum pump, a bell jar, or a defoaming apparatus equipped with an evacuation device. No particular limitation is imposed on the reduced pressure, but preferred is such a pressure that low-boiling components contained in the resin composition do not boil. No particular limitation is imposed on the time of defoaming under reduced pressure, but it is preferably 3 to 60 minutes. When the reduced pressure defoaming time is three minutes or longer, air bubbles entrained into the resin composition can be removed, whereas when the defoaming time is 60 minutes or shorter, the defoaming time can be shortened without evaporation of the solvent contained in the resin composition, thereby elevating productivity.

Hereinafter, the cured film of the resin composition for forming a cladding layer of the present invention will be described.

The cured film of the resin composition for forming a cladding layer of the present invention preferably has a tensile modulus of 1 to 2,000 MPa measured at 25° C., more preferably 10 to 1,500 MPa, still more preferably 20 to 1,000 MPa. When the tensile modulus at 25° C. of the cured film is 2,000 MPa or less, the film can be bent in the thickness direction with a small radius of curvature, whereas when the tensile modulus is 1 MPa or more, the film restores its original shape without permanent elongation, after a folding-type bending durability test, a twisting durability test, and a slide-type bending durability test. Both cases are preferred. In the film optical waveguide employing the cured resin film for forming a cladding layer, mechanical tensile force applied thereto is absorbed by the upper and lower cladding layers, whereby deformation of the core is reduced, and deterioration of transmission characteristics of the film waveguide can be prevented.

The cured film of the resin composition for forming a cladding layer of the present invention preferably has a tensile elongation at break, as determined by an elongation test at 25° C., of 10 to 600%, more preferably 15 to 400%, still more preferably 20 to 200%. When the tensile elongation at break is 10% or more, the film is not fragile and does not break at bending, whereas when it is 600% or less, elongation of the film during a folding-type bending durability test, a twisting durability test, and a slide-type bending durability test, and failure to restore the original shape can be prevented. Both cases are preferred. Notably, the term "tensile elongation at break" refers to a percent elongation at break of a film in a tensile test of the film.

When the cured resin film for forming a cladding layer is employed in the film optical waveguide, mechanical tensile force applied thereto is absorbed by the upper and lower cladding layers, whereby deformation of the core is reduced, and deterioration of transmission characteristics of the film waveguide can be prevented.

Preferably, the cured film of the resin composition for forming a cladding layer of the present invention exhibits no breakage in a repeated bending test (folding-type bending durability test); for example, 100,000 times of folding with a radius of curvature of 1 to 5 mm (e.g., 2 mm). More preferably, the cured film does not exhibit breakage after 1,000,000 repetition of the bending test.

When the cured film, which exhibits no breakage, is employed for forming a cladding layer, the optical waveguide employing the cured film as a cladding layer permits reliable optical transmission for a long period of time. Such an optical waveguide can be employed as a part which is frequently subjected to bending; e.g., a hinge of a mobile phone. In order to realize small scale apparatuses, optical waveguides need to not break in bending with a smaller radius of curvature. From this viewpoint, more preferably, the optical waveguide generates no breakage at a radius of curvature 0.5 mm at bending. Breakage can be confirmed through observation under a magnifying lens or a microscope, or through visual observation.

Preferably, the cured film of the resin composition for forming a cladding layer of the present invention exhibits no breakage in a repeated twisting test (twisting durability test); for example 100,000 repetitions of twisting. More preferably, the cured film does not exhibit breakage after 1,000,000 repetitions of the twisting test.

When the cured film, which exhibits no breakage, is employed for forming a cladding layer, the optical waveguide employing the cured film as a cladding layer permits reliable optical transmission for a long period of time. Such an optical waveguide can be employed as a part which is frequently subjected to bending; e.g., a hinge of a mobile phone. Breakage can be confirmed through observation under a magnifying lens or a microscope, or through visual observation.

Preferably, the cured film of the resin composition for forming a cladding layer of the present invention exhibits no breakage in a slide-type durability test, for example, 100,000 repetitions of sliding with a radius of curvature of 1 to 5 mm (e.g., 1.5 mm or 2 mm). More preferably, the cured film does not exhibit breakage after 1,000,000 repetitions of the slide-type durability test. When the cured film, which exhibits no breakage, is employed for forming a cladding layer, the optical waveguide employing the cured film as a cladding layer permits reliable optical transmission for a long period of time. Such an optical waveguide can be employed as a part which is frequently subjected to sliding; e.g., a sliding part of a mobile phone. In order to realize small scale apparatuses, optical waveguides need to not break in bending with a smaller radius of curvature. From this viewpoint, more preferably, the optical waveguide generate no breakage at a radius of curvature 1.0 mm at sliding. Breakage can be confirmed through observation under a magnifying lens or a microscope, or through visual observation.

Preferably, the cured film (thickness: 110 μm) of the resin composition for forming a cladding layer of the present invention exhibits a total light transmittance of 70% or more. When the transmittance is 70% or more, the optical waveguide produced from the cured film exhibits excellent visibility of the core portion. By virtue of high visibility, of the core, positioning during processing of the outer shape of the optical waveguide by means of a dicing saw is facilitated. From this viewpoint, the transmittance is more preferably 80% or more, particularly preferably 90% or more. No particular limitation is imposed on the upper limit of total light transmittance.

Preferably, the cured film (thickness: 110 μm) of the resin composition for forming a cladding layer of the present invention exhibits a haze of 30% or less. When the haze is 30% or less, the optical waveguide produced from the cured film exhibits excellent visibility of the core portion. By virtue of high visibility, of the core, positioning during processing of the outer shape of the optical waveguide by means of a dicing saw is facilitated. From this viewpoint, the haze is more preferably 20% or less, particularly preferably 10% or less.

Preferably, the cured film produced by polymerizing and curing the resin composition for forming a cladding layer of the present invention exhibits a refractive index at 25° C. and 830 nm of 1.400 to 1.700. Such a refractive index is almost equivalent to that of optical resin of general use. Thus, when the refractive index is 1.400 to 1.700, the cured film of the resin composition maintains general properties of optical materials. From this viewpoint, the refractive index of the cured film is more preferably 1.425 to 1.675, particularly preferably 1.450 to 1.650.

Hereinafter, the resin film for forming a cladding layer of the present invention will be described.

The resin film for forming a cladding layer of the present invention employs the resin composition for forming a cladding layer. The resin film can be readily produced through applying, onto a suitable support film, a resin composition for forming a cladding layer, the composition containing the aforementioned components (A), (B), and (D) and optional component (C). Alternatively, when the resin composition for forming a cladding layer has been diluted with the aforementioned organic solvent, the resin composition is applied onto the support film, and the organic solvent is removed, to thereby produce the resin film.

No particular limitation is imposed on the material of the support film, and examples thereof include polyesters such as polyethylene terephthalate, polybutylene terephthalate, and polyethylene naphthalate; polyolefins such as polyethylene and polypropylene; polycarbonates; polyamides; polyimides; polyamide-imides; polyether imides; polyether sulfides; polyether sulfones; polyether ketones; polyphenylene ethers; polyphenylene sulfides; polyarylates; polysulfones; and liquid crystal polymers. Of these, polyethylene terephthalate, polybutylene terephthalate, and polyethylene naphthalate, polypropylene, polycarbonates, polyamides, polyimides, polyamide-imides, polyphenylene ethers, polyphenylene sulfides, polyarylates, and polysulfones are preferred from the viewpoints of flexibility and high toughness.

From this viewpoint of enhanced peelability from the resin layer, the support film may be optionally subjected to mold-release treatment with a silicone compound, a fluorine-containing compound, etc.

The thickness of the support film, which may appropriately varied in response to the flexibility of interest, is preferably 3 to 250 μm. When the support film has a thickness of 3 μm or more, sufficient film strength can be attained, whereas when the thickness of 250 μm or less, sufficient flexibility can be attained. From these viewpoints, the thickness of the support film is more preferably 5 to 200 μm, particularly preferably 7 to 150 μm.

To the resin film for forming a cladding layer, which is produced through applying onto the support film the resin composition for forming a cladding layer, an optional protective film may be attached, to thereby form a laminate having a tri-layer structure of the support film, the resin layer, and the protective film.

No particular limitation is imposed on the protective film, but the film is preferably formed from a polyester such as polyethylene terephthalate, polybutylene terephthalate, or polyethylene naphthalate or polyolefin such as polyethylene and polypropylene, from the viewpoints of flexibility and high toughness. From the viewpoint of enhanced peelability from the resin layer, the protective film may be optionally subjected to mold-release treatment with a silicone compound, a fluorine-containing compound, etc.

The thickness of the protective film, which may appropriately varied in response to the flexibility of interest, is preferably 10 to 250 μm. When the protective film has a thickness of 10 μm or more, sufficient film strength can be attained, whereas when the thickness of 250 μm or less, sufficient flexibility can be attained. From these viewpoints, the thickness of the protective film is more preferably 15 to 200 μm, particularly preferably 20 to 150 μm.

No particular limitation is imposed on the thickness of the resin layer of the resin film for forming a cladding layer of the present invention, but generally, the thickness (after drying) is preferably 5 to 500 μm. When the thickness (after drying) of the resin layer of the resin film for forming a cladding layer is 5 μm or more, the resin film or cured resin film has sufficient strength by virtue of a sufficient thickness, whereas when the thickness is 500 μm or less, the resin film can be completely dried to thereby suppress the amount of solvent remaining in the film. In this case, foaming of the cured resin film during heating is prevented.

The thus-produced resin film for forming a cladding layer may be stored as, for example, a roll product. Alternatively, the rolled film is cut to provide pieces of suitable dimensions, and the cut pieces (sheets) may be stored.

Hereinafter, application of the resin film for forming a cladding layer of the present invention to an optical waveguide will be described.

The resin film for forming a cladding layer of the present invention is preferably employed as at least one of the upper cladding layer and the lower cladding layer of the optical waveguide.

Next, the resin composition for forming a core portion of the optical waveguide of the present invention is designed so that the core portion has a refractive index more than that of a cladding layer. The resin composition may be a resin composition which can form a core pattern through an active light ray and is preferably a photosensitive resin composition.

The resin film for forming a core portion may be produced from the resin composition for forming a core portion through the same method as employed for producing the resin film for forming a cladding layer. No particular limitation is imposed on the support film employed in the production of the resin film for forming a core portion, so long as the exposure active ray for forming a core pattern can pass through the support film. Examples of the material of the support film include polyesters such as polyethylene terephthalate, polybutylene terephthalate, and polyethylene naphthalate; polyolefins such as polyethylene and polypropylene; polycarbonates; polyamides; polyimides; polyamide-imides; polyether imides; polyether sulfides; polyether sulfones; polyether ketones; polyphenylene ethers; polyphenylene sulfides; polyarylates; polysulfones; and liquid crystal polymers.

Of these, polyesters and polyolefins are preferred from the viewpoints of transmittance of the exposure active ray, flexibility, and high toughness. More preferably, a high-transparency support film is employed in order to enhance transmittance of the exposure active ray and to reduce roughening the side walls of the core pattern, Examples of such a high-transparency support film include COSMOSHINE A1517 and COSMOSHINE A4100 (product of Toyobo Co., Ltd.).

From the viewpoint of enhanced peelability from the resin layer, the support film may be optionally subjected to mold-release treatment with a silicone compound, a fluorine-containing compound, etc.

The support film of the resin film for forming a core portion preferably has a thickness of 5 to 80 μm. When the thickness of the support film is 5 μm or more, the support has sufficient strength, whereas when the thickness is 80 μm or less, the gap between the photomask and the resin layer for forming a core portion does not increase during formation of the core pattern, resulting in high pattern resolution. From these viewpoints, the thickness of the support film is more preferably 10 to 75 μm, particularly preferably 15 to 70 μm.

To the resin film for forming a core portion, which is produced through applying onto the support film the resin composition for forming a core portion, an optional protective film may be attached, to thereby form a laminate having a tri-layer structure of the support film, the resin layer, and the protective film.

The thus-produced resin film for forming a core portion may be stored as, for example, a roll product. Alternatively, the rolled film is cut to provide pieces of suitable dimensions, and the cut pieces (sheets) may be stored.

Hereinafter, the optical waveguide of the present invention will be described.

FIG. 1(a) is a cross-section of an embodiment of the optical waveguide of the invention. An optical waveguide 1 has a base 5, and on the base 5, there are provided a core portion 2 formed of a high-refractive-index core-portion-forming resin composition, and a lower cladding layer 4 and an upper cladding layer 3 each formed of a low-refractive-index resin composition for forming a cladding layer.

The resin composition of the present invention for forming a cladding layer or the resin film of the present invention for forming a cladding layer is preferably employed for forming at least one of the lower cladding layer 4 and the upper cladding layer 3 of the optical waveguide 1.

Through employment of the resin film for forming a cladding layer and the core-portion-forming resin film, the flatness of each layer, interlayer adhesion between the core and the clad, and resolution (for fine line or narrow line spacing) during formation of a core pattern of the optical waveguide can be further enhanced. Thus, there can be formed a fine pattern having high flatness and a narrow line width and line spacing.

No particular limitation is imposed on the material of the base 5 of the optical waveguide 1, and examples thereof include a glass-epoxy resin substrate, a ceramic substrate, a glass substrate, a silicon substrate, a plastic substrate, a metal substrate, a resin-layer-coated substrate, a metal-layer-coated substrate, plastic film, resin-layer-coated plastic film, and metal-layer-coated plastic film.

When the optical waveguide 1 has a base having flexibility and high toughness; e.g., a support film made of the resin film for forming a cladding layer, as the base 5, a flexible optical waveguide is provided. The base 5 may be employed as a protective film for the optical waveguide 1. Through employment of such a support film base as the base 5, the optical waveguide 1 can be imparted with flexibility and high toughness. In this case, the cladding-layer-forming resin is preferably formed into a film on the adhesive-treated surface of the support film. In addition, through employment of the base 5 as a protective film, contamination or damage of the optical waveguide 1 is prevented, thereby enhancing ease of handling.

From the aforementioned viewpoints, possible preferred embodiments are a configuration in which the base 5 serving as a protective film is disposed on the upper surface of the upper cladding layer 3 (as shown in FIG. 1(b)) and a configuration in which the base 5 serving as a protective film is disposed on the lower surface of the lower cladding layer 4 and the upper surface of the upper cladding layer 3 (as shown in FIG. 1(c)).

In the case where the optical waveguide 1 has sufficient flexibility and high toughness, the base 5 serving as a protective film may be omitted (as shown in FIG. 1(d)).

No particular limitation is imposed on the thickness of the lower cladding layer 4, but it is preferably 2 to 200 μm. When the thickness of the lower cladding layer 4 is 2 μm or more, the transmitted light can be readily confined in the core, whereas when the thickness is 200 μm or less, the thickness of the optical waveguide 1 is not excessive. Notably, the thickness of the lower cladding layer 4 means the length ranging from the interface between the core portion 2 and the lower cladding layer 4 to the bottom surface of the lower cladding layer 4.

No particular limitation is imposed on the thickness of the resin film for forming a lower cladding layer, but the thickness is adjusted so that the thickness of the lower cladding layer 4 after curing falls within the aforementioned range.

No particular limitation is imposed on the height of the core portion 2, but it is preferably 10 to 150 μm. When the height of the core portion is 10 μm or more, tolerance in positioning a light-receiving/emitting element or an optical fiber on the formed optical waveguide is not reduced, whereas when the height is 150 μm or less, the efficiency of connecting of a light-receiving/emitting element or an optical fiber to the formed optical waveguide is not reduced. From these viewpoints, the height of the core portion is more preferably 15 to 130 μm, particularly preferably 20 to 120 μm. No particular limitation is imposed on the thickness of the resin film for forming a core portion, but the thickness is adjusted so that the height of the core portion after curing falls within the aforementioned range.

No particular limitation is imposed on the thickness of the upper cladding layer 3, so long as the thickness allows the core portion 2 to be buried in the upper cladding layer. The thickness (after drying) is preferably 12 to 500 μm. The thickness of the upper cladding layer 3 may be equivalent to or different from that of the lower cladding layer 4 formed in advance. However, for reliably burying the core portion 2, the thickness is preferably more than the thickness of the lower cladding layer 4. Notably, the thickness of the upper cladding layer 3 means the length ranging from the interface between the core portion 2 and the lower cladding layer 4 to the top surface of the upper cladding layer 3.

Preferably, the flexible optical waveguide of the present invention exhibits no breakage after a repeated bending test with 100,000 times of folding with a radius of curvature of 1 to 5 mm (e.g., 2 mm). More preferably, the flexible optical waveguide does not exhibit break after undergoing the bending test 1,000,000 times. When the optical waveguide exhibits no breakage, the optical waveguide permits reliable optical transmission for a long period of time. Such an optical waveguide can be employed as a part which is frequently subjected to bending; e.g., a hinge of a mobile phone. In order to realize small scale apparatuses, optical waveguides need to not break in bending with a smaller radius of curvature. From this viewpoint, more preferably, the optical waveguide generate no breakage at a radius of curvature 0.5 mm at bending. Breakage can be confirmed through observation under a magnifying lens or a microscope, or through visual observation.

The film optical waveguide of the present invention has a cladding layer having a small tensile modulus preferably 1 to 2,000 MPa. Therefore, the followability of the interface of the film optical waveguide upon bending or shape-restoring can be enhanced.

The optical waveguide of the present invention preferably has a relative refractive index difference (core portion/cladding layer) of 1 to 10%. When the parameter is 1% or more, leakage of the light propagating in the core portion to a cladding layer during bending is prevented, whereas when the parameter is 10% or less, the propagating light is not broaden at a connection portion between the optical waveguide and an optical fiber or the like, thereby suppressing connection loss. From these viewpoints, the relative refractive index difference is more preferably 1.5 to 7.5%, particularly preferably 2 to 5%.

The optical waveguide of the present invention preferably has a light transmission loss of 0.3 dB/cm or less. When the transmission loss is 0.3 dB/cm or less, light transmission loss is small, and sufficient transmitted signal can be obtained. Thus, the transmission loss is more preferably 0.2 dB/cm or less, still more preferably 0.1 dB/cm or less.

The optical waveguide of the present invention, which is excellent in bending durability, twisting durability, transparency, reliability, and heat resistance, may also be employed as an optical transmission path of an optical module. Examples of the embodiment of the optical module include an optical fiber-connected optical waveguide in which an optical fiber is connected to each end of the optical waveguide; a connector-attached optical waveguide in which a connector is connected to each end of the optical waveguide; a photo-electric complex substrate in which an optical waveguide is integrated into a printed wiring board; photo-electric conversion module in which an optical waveguide is integrated into an optical/electric converter that allows mutual conversion of a photo-signal and an electric signal; and a wavelength-mixed wave separator in which an optical waveguide is combined with a wavelength-separating filter.

No particular limitation is imposed on the printed wiring board which is integrated into the photo-electric complex substrate, and examples thereof include rigid substrates such as a glass epoxy resin substrate and a ceramic substrate; and flexible substrates such as a polymide substrate and a polyethylene terephthalate substrate.

Hereinafter, the method for forming the optical waveguide 1 by use of the resin composition of the invention for forming a cladding layer and/or the resin film of the invention for forming a cladding layer will be described. Notably, in the following description, the cladding-layer-forming resin and the core-portion-forming resin are collectively referred to as "optical-waveguide-forming resin."

No particular limitation is imposed on the method for producing the optical waveguide 1 of the present invention. In one exemplary method, an optical-waveguide-forming resin layer is formed on the base by use of an optical-waveguide-forming resin or an optical-waveguide-forming resin film.

No particular limitation is imposed on the material of the base employed in the present invention, and examples thereof include a glass-epoxy resin substrate, a ceramic substrate, a glass substrate, a silicon substrate, a plastic substrate, a metal substrate, a resin-layer-coated substrate, a metal-layer-coated substrate, plastic film, resin-layer-coated plastic film, and metal-layer-coated plastic film.

No particular limitation is imposed on the method for forming the optical-waveguide-forming resin layer, and examples thereof include application of an optical-waveguide-forming resin composition through a coating method such as spin coating, dip coating, spraying, bar coating, roller coating, curtain coating, gravure coating, screen coating, or ink-jet coating.

In the case where the optical-waveguide-forming resin composition has been diluted with an appropriate organic solvent, a drying step may be optionally performed after formation of the resin layer. Examples of the drying method include drying with heating and drying under reduced pressure. If required, these methods may be performed in combination.

Another method for forming the optical-waveguide-forming resin layer is a lamination method employing an optical-waveguide-forming resin film made of an optical-waveguide-forming resin composition.

Among the aforementioned methods, a lamination method employing an optical-waveguide-forming resin film is preferred, since an optical waveguide which has excellent flatness and a fine pattern having a narrow line width and line spacing can be formed.

Hereinafter, the method for producing the optical waveguide 1 by use of an optical-waveguide-forming resin film for forming a lower cladding layer, a core portion, and an upper cladding layer will be described. However, the present invention is not limited by this method.

Firstly, in a first step, a resin film for forming a lower cladding layer is laminated on a base 5. No particular limitation is imposed on the lamination method employed in the first step. In one exemplary method, the resin film is laminated by pressing under heating to the substrate by means of a roller laminator or a plate laminator. The plate laminator employed in the present invention refers to a laminator which bonds materials to be laminated by pressure. In use, the materials are inserted in a space between a pair of plates, and pressure is applied to the plates. For example, a vacuum pressure laminator is preferably employed. The heating temperature is preferably 20 to 130° C., and the bonding pressure is preferably 0.1 to 1.0 MPa. However, no particular limitation is imposed the lamination conditions. When a protective layer is attached to the resin film for forming a lower cladding layer, the resin film is laminated after removal of the protective film.

In the case where lamination is performed by means of a vacuum pressure laminator, a resin film for forming a lower cladding layer may be temporally attached in advance to the base 5 by means of a roller laminator. From the viewpoint of enhancement of adhesion and followability, the resin film is preferably attached with pressure. During press attachment, a laminator having a heat roller may be employed with heating. The lamination temperature is preferably 20 to 130° C. When the lamination temperature is 20° C. or more, adhesion between the resin film for forming a lower cladding layer and the base 5 increases, whereas when the temperature is 130° C. or less, excessive flowing of the resin layer during roller lamination is prevented, and a target thickness can be obtained. From these viewpoints, the lamination temperature is more preferably 40 to 100° C. The lamination pressure is preferably 0.2 to 0.9 MPa, and the lamination rate is preferably 0.1 to 3 m/min. However, no particular limitation is imposed on these lamination conditions.

The lower-cladding-layer-forming resin layer laminated on the base 5 is cured through light and/or heat, to thereby form a lower cladding layer 4. Removal of the support film of the resin film for forming a lower cladding layer may be performed before or after curing.

No particular limitation is imposed on the dose of the active ray for photo-curing the lower-cladding-layer-forming resin layer, but the dose is preferably 0.1 to 5 J/cm$^2$. In the case where the active ray penetrates the base, in order to effectively perform curing, a double-side light-exposure apparatus which can simultaneously radiates an active ray to both sides may be employed. Exposure to the active ray may be performed under heating. Before or after photocuring, an optional heat treatment may be performed at 50 to 200° C.

The heating temperature for thermally curing the lower-cladding-layer-forming resin layer is preferably 50 to 200° C. However, no particular limitation is imposed on the heating temperature.

In the case where the support film of the resin film for forming a lower cladding layer serves as the protective film 5 of the optical waveguide 1, photo and/or thermal curing may be performed under the same conditions without laminating the resin film for forming a lower cladding layer, to thereby form the lower cladding layer 4.

Removal of the protective film of the resin film for forming a lower cladding layer may be performed before or after curing.

In a second step, a core-portion-forming resin film is laminated on the lower cladding layer 4 through the same method as employed in the first step. The core-portion-forming resin layer is designed so that the core portion has a refractive index more than that of a lower-cladding-layer-forming resin layer, and is preferably a photosensitive resin composition which can form a core pattern through an active light ray.

In a third step, the core portion 2 (core pattern) is exposed to light. No particular limitation is imposed on the method of exposing the core portion 2 to light. Examples of the method include a method in which a core portion is imagewise irradiated with an active ray through a negative mask pattern called "art work" and a method in which a core portion is directly irradiated with an active ray through laser imaging without a photomask.

Examples of the light source of the active ray include those effectively UV rays such as an ultra-high-pressure mercury lamp, a high-pressure mercury lamp, a mercury-vapor arc lamp, a metal halide lamp, a xenon lamp, and a carbon arc lamp. Further examples include a flood lamp for photographic use and a solar lamp, which effectively radiate visible light.

The dose of the active ray to which the core portion 2 is exposed is preferably 0.01 to 10 J/cm$^2$. When the dose is 0.01 J/cm$^2$ or more, curing reaction proceeds sufficiently, and loss of the core portion 2 during development is suppressed, whereas when the dose is 10 J/cm$^2$ or less, the core portion 2 is not broadened due to excessive exposure, and a fine pattern is provided. Both case are preferred. From these viewpoints, the dose of the active ray is more preferably 0.03 to 5 J/cm$^2$, particularly preferably 0.05 to 3 J/cm$^2$.

Exposure of the core portion 2 may be performed by the mediation of the support film of the core-portion-forming resin film, or after removal of the support film.

After exposure, if required, optional heating may be performed in order to enhance resolution and adhesion of the core portion 2. No particular limitation is imposed on the duration from termination of UV irradiation to start of post-exposure heating, but the duration is preferably 10 minutes or shorter. The post-exposure heating temperature is preferably 40 to 160° C., and the post-exposure heating time is 30 seconds to 10 minutes. However, no particular limitation is imposed on these conditions.

In a fourth step, when the core portion 2 has been irradiated by the mediation of the support film of the core-portion-forming resin film, the support film is removed, and the cured portion is developed with a developer suited for the composition of the core-portion-forming resin layer.

No particular limitation is imposed on the development method, and examples thereof include a spray method, a dipping method, a paddle method, a spin method, a brushing method, and a scrapping method. If required, these methods may be employed in combination.

No particular limitation is imposed on the developer, and examples thereof include organic solvents such as an organic solvent and a quasi-aqueous developer formed of an organic solvent and water; and alkaline developers such as an aqueous alkaline solution and a quasi-aqueous alkaline developer formed of an aqueous alkaline solution and one or more organic solvents. The development temperature is adjusted to suit the developability of the core-portion-forming resin layer.

No particular limitation is imposed on the organic solvent, and examples thereof include aromatic hydrocarbons such as toluene, xylene, mesitylene, cumene, and p-cymene; chain ethers such as diethyl ether, tert-butyl methyl ether, cyclopentyl methyl ether, and dibutyl ether; cyclic ethers such as tetrahydrofuran and 1,4-dioxane; alcohols such as methanol, ethanol, isopropanol, butanol, ethylene glycol, and propylene glycol; ketones such as acetone, methyl ethyl ketone, methyl isobutyl ketone, cyclohexanone, and 4-hydroxy-4-methyl-2-pentanone; esters such as methyl acetate, ethyl acetate, butyl acetate, methyl lactate, ethyl lactate, and γ-butyrolactone; carbonate esters such as ethylene carbonate and propylene carbonate; polyhydric alcohol alkyl ethers such as ethylene glycol monomethyl ether, ethylene glycol monoethyl ether, ethylene glycol monobutyl ether, ethylene glycol dimethyl ether, ethylene glycol diethyl ether, propylene glycol monomethyl ether, propylene glycol monoethyl ether, propylene glycol dimethyl ether, propylene glycol diethyl ether, diethylene glycol monomethyl ether, diethylene glycol monoethyl ether, diethylene glycol monobutyl ether, diethylene glycol dimethyl ether, and diethylene glycol diethyl ether; polyhydric alcohol alkyl ether acetates such as ethylene glycol monomethyl ether acetate, ethylene glycol monoethyl ether acetate, ethylene glycol monobutyl ether acetate, propylene glycol monomethyl ether acetate, propylene glycol monoethyl ether acetate, diethylene glycol monomethyl ether acetate, and diethylene glycol monoethyl ether acetate; and amides such as N,N-dimethylformamide, N,N-dimethylacetamide, and N-methylpyrrolidone.

These organic solvents may be used singly or in combination of two or more species. The organic solvent may contain a surfactant, a defoaming agent, and other additives.

No particular limitation is imposed on the quasi-aqueous developer, so long as the developer is formed of water and one or more organic solvents.

Generally, the organic solvent concentration is preferably 2 to 90 mass %. The quasi-aqueous developer may contain a small amount of a surfactant, a defoaming agent, and other additives.

No particular limitation is imposed on the base of the aqueous alkaline solution, and examples of the base include alkali metal hydroxides such as lithium hydroxide, sodium hydroxide, and potassium hydroxide; alkali metal carbonates such as lithium carbonate, sodium carbonate, and potassium carbonate; alkali metal bicarbonates such as lithium bicarbonates, sodium bicarbonate, and potassium bicarbonate; alkali metal phosphates such as potassium phosphate and sodium phosphate; alkali metal pyrophosphates such as potassium pyrophosphate and sodium pyrophosphate; sodium salts such as sodium tetraborate and sodium metasilicate; ammonium salts such as ammonium carbonate and ammonium hydrogencarbonate; and organic bases such as tetramethylammonium hydroxide, triethanolamine, ethylenediamine, diethylenetriamine, 2-amino-2-hydroxymethyl-1,3-propanediol, and 1,3-diaminopropanol-2-morpholine.

These bases may be used singly or in combination of two or more species.

The aqueous alkaline solution employed in development preferably has a pH of 9 to 14 and may contain a surfactant, a defoaming agent, and other additives.

No particular limitation is imposed on the quasi-aqueous alkaline developer, so long as the developer is formed of an aqueous alkaline solution and one or more species of the aforementioned organic solvents. The pH of the quasi-aqueous alkaline developer is preferably as low as possible. The pH is preferably 8 to 13, more preferably 9 to 12.

Generally, the organic solvent concentration is preferably 2 to 90 mass %. The quasi-aqueous alkaline developer may contain a small amount of a surfactant, a defoaming agent, and other additives.

After completion of development, if required, washing may be performed with the organic solvent, the quasi-aqueous washing liquid formed of the organic solvent and water, or water.

No particular limitation is imposed on the washing method, and examples thereof include a spray method, a dipping method, a paddle method, a spin method, a brushing method, and a scrapping method. If required, these methods may be employed in combination.

The aforementioned organic solvents may be used singly or in combination of two or more species. Generally, the quasi-aqueous washing liquid preferably has an organic solvent concentration of 2 to 90 mass %. The washing temperature is adjusted to suit the developability of the core-portion-forming resin layer.

After development or washing, if required, optional development and/or heating may be performed in order to enhance curability and adhesion of the core portion 2. The heating temperature is preferably 40 to 200° C., and the dose of active ray is preferably 0.01 to 10 $J/cm^2$. However, no particular limitation is imposed on these conditions.

In a fifth step, a resin film for forming an upper cladding layer is laminated on the lower cladding layer 4 and the core portion 2 through the same method as employed in the first and second steps. The upper-cladding-layer-forming resin layer is designed so that the layer has a refractive index lower than that of a core-portion-forming resin layer. The upper-cladding-layer-forming resin layer preferably has a thickness greater than the height of the core portion 2.

Subsequently, in a manner similar to that of the first step, an upper cladding layer 3 is formed by photo and/or thermal curing of the upper-cladding-layer-forming resin layer.

No particular limitation is imposed on the dose of active ray for photo-curing the upper-cladding-layer-forming resin layer, but the dose is preferably 0.1 to 30 $J/cm^2$. In the case where the active ray penetrates the base, in order to effectively perform curing, a double-side light-exposure apparatus which can simultaneously radiates an active ray to both sides may be employed. If required, exposure to the active ray may be performed under heating. Before or after photocuring, an optional heat treatment may be performed. No particular limitation is imposed on the heating temperature during irradiation with the active ray and/or after irradiation, but is preferably 50 to 200° C.

No particular limitation is imposed on the heating temperature for thermally curing the upper-cladding-layer-forming resin layer, but it is preferably 50 to 200° C.

In the case where removal of the support film of the resin film for forming an upper cladding layer is needed, the support film may be removed before or after curing.

Through the aforementioned steps, the optical waveguide 1 can be produced.

EXAMPLES

The present invention will next be described in more detail by way of examples, which should not be construed as limiting the invention thereto.

Example 1

Preparation of Resin Varnish CLV-1 for Forming Cladding Layer

The following components (A) to (D) were mixed under stirring: (A) a (meth)acrylic polymer; specifically, a cyclohexanone solution of epoxy-group-containing acrylic rubber (HTR-860P-3, product of Nagase ChemteX Corporation, weight average molecular weight: 800,000, solid content: 12 mass %) (500 parts by mass (solid content: 60 parts by mass)); (B) a urethane (meth)acrylate; specifically, phenyl glycidyl ether acrylate toluene diisocyanate urethane prepolymer (AT-600, product of KYOEISHA Chemical Co., Ltd.) (20 parts by mass); (C) a (meth)acrylate; specifically, trimethylolpropane triacrylate (TMP-A, product of KYOEISHA Chemical Co., Ltd.) (20 parts by mass); and (D) photoradical polymerization initiators; specifically, bis(2,4,6-trimethylbenzoyl)phenylphosphine oxide (Irgacure 819, product of Ciba Specialty Chemicals) (1 part by mass), and 1-[4-(2-hydroxyethoxy)phenyl]-2-hydroxy-2-methyl-1-propane-1-one (Irgacure 2959, product of Ciba Specialty Chemicals) (1 part by mass). Thereafter, the resultant mixture was defoamed under reduced pressure, to thereby prepare resin varnish CLV-1 for forming a cladding layer (hereinafter may be referred to as "cladding-layer-forming resin varnish CLV-1").

[Production of Resin Film CLF-1 for Forming Cladding Layer]

Cladding-layer-forming resin varnish CLV-1 was applied to a PET film having a surface subjected to mold release treatment (hereinafter such a film may be referred to as a "mold-release-treated PET film") (A53, product of Teijin DuPont Films, thickness: 25 µm) on the side of the mold-release-treated surface by means of a coating machine (Multicoater TM-MC, product of Hirano Tecseed Co., Ltd.), followed by drying at 100° C. for 20 minutes. Subsequently, a mold-release-treated PET film (A31, product of Teijin DuPont Films, thickness: 25 µm) serving as a protective film was attached to the resin-coated PET film, to thereby produce resin film CLF-1 for forming a cladding layer (hereinafter may be referred to as "cladding-layer-forming resin film CLF-1"). The thickness of the resin layer may be optionally adjusted by regulating the gap of the coating machine employed. In Example 1, the thickness of the resin layer was adjusted so as to attain a thickness after curing of: 20 µm for a lower-cladding-layer-forming resin film; 90 µm for an upper-cladding-layer-forming resin film; or 55 µm for a cured film for measurement of refractive index.

[Production of Cured Film for Tensile Test, Folding-Type Bending Durability Test, Slide-Type Bending Durability Test, Measurement of Refractive Index, Twisting Durability Test, Measurement of Total Transmittance, and Measurement of Haze]

By means of a roll laminator (HLM-1500, product of Hitachi Chemical Techno Plant Co., Ltd.), lower-cladding-layer-forming resin film CLF-1 from which the protective film (A31) had been removed was laminated, at 0.4 MPa, 80° C., and 0.4 m/min, on upper-cladding-layer-forming resin film CLF-1 from which the protective film (A31) had been removed. Subsequently, the resultant product was irradiated with UV rays (wavelength: 365 nm, 4,000 mJ/cm$^2$) by means of a UV-ray irradiator (MAP-1200-L, product of Dainippon Screen Mfg. Co., Ltd.). After curing at 160° C. for one hour, the support film (A53) was removed, to thereby produce a cured film having a thickness of 110 µm.

[Tensile Test]

The above-produced cured film (width: 10 mm, length: 70 mm) was subjected to a tensile test (distance between holding tools: 50 mm) according to JIS K 7127 by means of a tensile tester (RTM-100, product of Orientec Co., Ltd.) at 25° C. and a tensile speed of 50 mm/min.

(1) Tensile Modulus

Tensile modulus was calculated by use of an initial straight line portion of a tensile stress-strain curve on the basis of the following formula.

Tensile modulus (MPa)=difference in stress between two points on the straight line (N)÷original average cross-sectional area of a cured film (mm$^2$)÷difference in strain between the same two points (2) Percent Elongation at Break Percent elongation at break was calculated on the basis of the following formula.

Percent elongation at break(%)=(distance between holding tools at break(mm)−initial distance between the holding tools(mm))÷initial distance between the holding tools(mm)×100

[Folding-Type Bending Durability Test]

The above-produced cured film (width: 5 mm, length: 10 mm) was subjected to a bending durability test by means of a bending durability tester (product of Daisho Denshi Co., Ltd.) under the following conditions: bending angle: 0 to 180°, bending radius of curvature: 1.5 mm, bending speed: twice/second. For evaluation of folding-type bending durability, the cured film was observed every 10,000 repetitions of bending to determine whether or not breakage occurred, and the maximum of bending repetitions at which no breakage was observed was determined. The expression "no breakage after X repetitions" shown in tables refers to the case where no breakage was observed after X repetitions of bending (i.e., maximum of bending repetitions). After X repetitions of bending, the cured film was not subjected to the test any more.

[Twisting Durability Test]

The above-produced cured film (width: 2 mm, length: 40 mm) was subjected to a twisting durability test by means of a bending durability tester (product of Daisho Denshi Co., Ltd.) under the following conditions: twisting angle: ±180°, distance between holding tools: 20 mm, twisting speed: 0.5 times/second. For evaluation of twisting durability, the cured film was observed every 10,000 repetitions of twisting to determine whether or not breakage occurred, and the maximum of twisting repetitions at which no breakage was observed was determined. The expression "no breakage after X repetitions" shown in tables refers to the case where no breakage was observed after X repetitions of twisting (i.e., maximum of twisting repetitions). After X repetitions of twisting, the cured film was not subjected to the test any more.

[Slide-Type Bending Durability Test]

Figure 2:
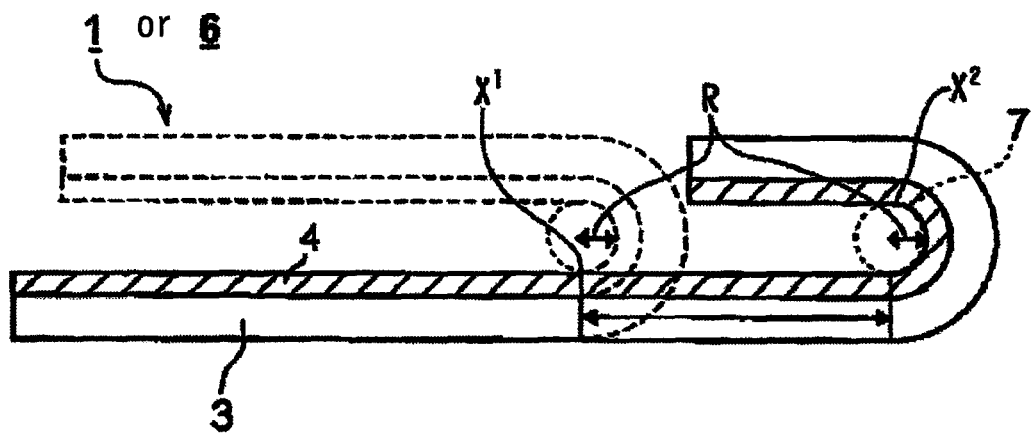
FIG. 2 A cross-sectional view of a cured film of the resin composition for forming a cladding layer of the present invention in a slide-type bending durability test, or showing an embodiment of the optical waveguide of the present invention.

The above-produced cured film 6 (width: 2 mm, length: 50 mm) was subjected to a slide-type bending durability test by means of a slide-type bending durability tester (product of Daisho Denshi Co., Ltd.) shown in FIG. 2. For this test, the cured film (width: 2 mm, length: 50 mm) was placed so as to be along an axis for bending (virtual axis) 7. The test was carried out under the following conditions: bending radius of curvature (R): 1.5 mm, slide speed: 80 mm/second, distance between $X^1$ and $X^2$: 20 mm. For evaluation of slide-type bending durability, the cured film was observed every 10,000 repetitions of bending to determine whether or not breakage occurred, and the maximum of bending repetitions at which no breakage was observed was determined. The expression "no breakage after X repetitions" shown in tables refers to the case where no breakage was observed after X repetitions of bending (i.e., maximum of bending repetitions). After X repetitions of bending, the cured film was not subjected to the test any more.

[Measurement of Total Transmittance and Haze]

[Measurement of Transmittance]

The total transmittance and haze of the above-produced cured film were measured by means of a colorimeter/turbidity meter (COH 400, product of Nippon Denshoku Industries Co., Ltd.). The total transmittance and haze were evaluated according to the following criteria.

(1) Total Transmittance

AA: 90% or more;

BB: 70% or more and less than 90%;

CC: 50% or more and less than 70%; and

DD: less than 50%.

(2) Haze

AA: 10% or less;
BB: more than 10% and 20% or less;
CC: more than 20% and 30% or less; and
DD: more than 30%.

[Measurement of Refractive Index]

The refractive index of the above-produced cured film was measured at 25° C. and 830 nm by means of a prism coupler (SPA-4000, product of Sairon Technology).

[Preparation of Resin Varnish COV-1 for Forming Core Portion]

The following components were mixed under stirring: a binder polymer; specifically, a propylene glycol monomethyl ether acetate solution of phenoxy resin (YP-70, product of Tohto Kasei Co., Ltd., solid content: 40 mass %) (63 parts by mass (solid content: 25 parts by mass)); polymerizable compounds; specifically, a propylene glycol monomethyl ether acetate solution of ethoxylated fluorene diacrylate (A-BPEF/PGMAC70, product of Shin-Nakamura Chemical Co., Ltd., solid content: 70 mass %) (54 parts by mass (solid content: 38 parts by mass)), and bisphenol A epoxy acrylate (EA-1020, product of Shin-Nakamura Chemical Co., Ltd.) (38 parts by mass); and photoradical polymerization initiators; specifically, 1-[4-(2-hydroxyethoxy)phenyl]-2-hydroxy-2-methyl-1-propane-1-one (Irgacure 2959, product of Ciba Specialty Chemicals) (1 part by mass) and bis(2,4,6-trimethylbenzoyl)phenylphosphine oxide (Irgacure 819, product of Ciba Specialty Chemicals) (1 part by mass). Thereafter, the resultant mixture was defoamed under reduced pressure, to thereby prepare resin varnish COV-1 for forming a core portion (hereinafter may be referred to as "core-forming resin varnish COV-1").

[Production of Resin Film COF-1 for Forming a Core Portion]

In a manner similar to that of the aforementioned cladding-layer-forming resin film, core-forming resin varnish COV-1 was applied to a non-treated surface of a PET film (A1517, product of Toyobo Co., Ltd., thickness: 16 μm), followed by drying. Subsequently, a mold-release-treated PET film (A31, product of Teijin DuPont Films, thickness: 25 μm) serving as a protective film was attached to the resin-coated PET film, to thereby produce resin film COF-1 for forming a core portion (hereinafter may be referred to as "core-forming resin film COF-1"). The thickness of the resin layer may be optionally adjusted by regulating the gap of the coating machine employed. In Example 1, the thickness of the resin layer was adjusted so as to attain a thickness after curing of 70 μm.

[Production of Cured Film for Measurement of Refractive Index]

Core-forming resin film COF-1 was irradiated with UV rays (wavelength: 365 nm, 2,000 mJ/cm$^2$) by means of a UV-ray irradiator (MAP-1200-L, product of Dainippon Screen Mfg. Co., Ltd.). The protective film (A31) was removed, and, after thermal treatment at 160° C. for one hour, the support film (A1517) was removed, to thereby produce a cured film having a thickness of 50 μm (refractive index at 25° C. and 830 nm: 1.586). The refractive index of the film was determined in a manner similar to that described above.

[Production of Optical Waveguide]

Lower-cladding-layer-forming resin film CLF-1 was irradiated with UV rays (wavelength: 365 nm, 4,000 mJ/cm$^2$) by means of the aforementioned UV-ray irradiator. The protective film (A31) was removed, to thereby form a lower cladding layer.

Subsequently, by means of the aforementioned roll laminator, core-forming resin film COF-1 from which the protective film (A31) had been removed was laminated on the lower cladding layer at 0.4 MPa, 80° C., and 0.4 m/min. Furthermore, the resin film was press-bonded to the cladding layer by means of a vacuum-pressure laminator (MVLP-500/600, product of Meiki Co., Ltd.) under the following conditions: pressure: 0.4 MPa, temperature: 80° C., pressurization time: 30 seconds.

Thereafter, the resultant product was irradiated, via a negative photomask (width: 50 μm), with UV rays (wavelength: 365 nm, 500 mJ/cm$^2$) by means of the aforementioned UV-ray irradiator, and then exposure was carried out at 80° C. for five minutes, followed by heating. The support film (A1517) was removed, and the core portion was developed with a developer (propylene glycol monomethyl ether acetate/N,N-dimethylacetamide=70/30 by mass). Thereafter, the resultant product was washed with propylene glycol monomethyl ether and then isopropanol, and dried under heating at 100° C. for 10 minutes.

Subsequently, upper-cladding-layer-forming resin film CLF-1 from which the protective film (A31) had been removed was laminated on the core portion and the lower cladding layer by means of the aforementioned vacuum-pressure laminator under the following conditions: pressure: 0.4 MPa, temperature: 120° C., pressurization time: 30 seconds. The resin film was irradiated with UV rays (wavelength: 365 nm, 4,000 mJ/cm$^2$), followed by curing at 160° C. for one hour, to thereby form an upper cladding layer.

Then, the support film (A4100) was removed from each of upper- and lower-cladding-layer-forming resin films CLF-1. Thereafter, by means of a dicing saw (DAD-341, product of Disco Corporation), the resultant product was cut into optical waveguides each having a waveguide length of 10 cm.

Examples 2 to 8

Cladding-layer-forming resin varnishes CLV-2 to 8 were prepared according to formulations shown in Table 1, and cladding-layer-forming resin films CLF-2 to 8 were produced in a manner similar to that described in Example 1. Table 1 shows the results of tensile test, folding-type bending durability test, slide-type bending durability test, measurement of refractive index, twisting durability test, measurement of total transmittance, and measurement of haze on the thus-produced cured films.

Subsequently, optical waveguides were produced by use of cladding-layer-forming resin films CLF-2 to 8 in a manner similar to that described in Example 1.

TABLE 1

| Items | | | Example 1<br>CLV-1<br>(CLF-1) | Example 2<br>CLV-2<br>(CLF-2) | Example 3<br>CLV-3<br>(CLF-3) | Example 4<br>CLV-4<br>(CLF-4) |
|---|---|---|---|---|---|---|
| Components<br>(parts by<br>mass) | (A) | HTR-860P-3 solution*[1]<br>(solid content: 12 mass %) | 500<br>(solid<br>content: 60) | 500<br>(solid<br>content: 60) | 500<br>(solid<br>content: 60) | 500<br>(solid<br>content: 60) |

TABLE 1-continued

|  |  | Items | Example 1 | Example 2 | Example 3 | Example 4 |
|---|---|---|---|---|---|---|
|  | (B) | AT-600*2 | 20 | — | — | — |
|  |  | UA-306H*3 | — | 20 | — | — |
|  |  | UA-306I*4 | — | — | 20 | — |
|  |  | UA-510H*5 | — | — | — | 20 |
|  |  | UA-412A*6 | — | — | — | — |
|  |  | UA-6100*7 | — | — | — | — |
|  |  | UA-160TM*8 | — | — | — | — |
|  |  | UF-8001*9 | — | — | — | — |
|  | (C) | TMP-A*10 | 20 | 20 | 20 | 20 |
|  | (D) | Irgacure 819*11 | 1 | 1 | 1 | 1 |
|  |  | Irgacure 2959*12 | 1 | 1 | 1 | 1 |
| Evaluations |  | Tensile modulus (MPa) | 1410 | 1170 | 900 | 1410 |
|  |  | Percent elongation at break (%) | 73 | 25 | 20 | 21 |
|  |  | Folding-type bending durability test | No breakage after 1,000,000 repetitions | No breakage after 1,000,000 repetitions | No breakage after 1,000,000 repetitions | No breakage after 1,000,000 repetitions |
|  |  | Twisting durability test | No breakage after 100,000 repetitions | No breakage after 100,000 repetitions | No breakage after 100,000 repetitions | No breakage after 100,000 repetitions |
|  |  | Slide-type bending durability test | No breakage after 100,000 repetitions | No breakage after 100,000 repetitions | No breakage after 100,000 repetitions | No breakage after 100,000 repetitions |
|  |  | Refractive index | 1.500 | 1.493 | 1.495 | 1.5 |
|  |  | Total transmittance (%)*13 | AA | AA | AA | AA |
|  |  | Haze (%)*14 | AA | AA | AA | AA |

|  |  | Items | Example 5 CLV-5 (CLF-5) | Example 6 CLV-6 (CLF-6) | Example 7 CLV-7 (CLF-7) | Example 8 CLV-8 (CLF-8) |
|---|---|---|---|---|---|---|
| Components (parts by mass) | (A) | HTR-860P-3 solution*1 (solid content: 12 mass %) | 500 (solid content: 60) | 500 (solid content: 60) | 500 (solid content: 60) | 500 (solid content: 60) |
|  | (B) | AT-600*2 | — | — | — | — |
|  |  | UA-306H*3 | — | — | — | — |
|  |  | UA-306I*4 | — | — | — | — |
|  |  | UA-510H*5 | — | — | — | — |
|  |  | UA-412A*6 | 20 | — | — | — |
|  |  | UA-6100*7 | — | 20 | — | — |
|  |  | UA-160TM*8 | — | — | 20 | — |
|  |  | UF-8001*9 | — | — | — | 20 |
|  | (C) | TMP-A*10 | 20 | 20 | 20 | 20 |
|  | (D) | Irgacure 819*11 | 1 | 1 | 1 | 1 |
|  |  | Irgacure 2959*12 | 1 | 1 | 1 | 1 |
| Evaluations |  | Tensile modulus (MPa) | 270 | 410 | 250 | 340 |
|  |  | Percent elongation at break (%) | 200 | 156 | 186 | 165 |
|  |  | Folding-type bending durability test | No breakage after 1,000,000 repetitions | No breakage after 1,000,000 repetitions | No breakage after 1,000,000 repetitions | No breakage after 1,000,000 repetitions |
|  |  | Twisting durability test | No breakage after 1,000,000 repetitions | No breakage after 1,000,000 repetitions | No breakage after 1,000,000 repetitions | No breakage after 1,000,000 repetitions |
|  |  | Slide-type bending durability test | No breakage after 1,000,000 repetitions | No breakage after 1,000,000 repetitions | No breakage after 1,000,000 repetitions | No breakage after 1,000,000 repetitions |

TABLE 1-continued

| | | | | |
|---|---|---|---|---|
| Refractive index | 1.49 | 1.491 | 1.489 | 1.49 |
| Total transmittance (%)[13] | AA | AA | AA | AA |
| Haze (%)[14] | CC | CC | AA | AA |

[1]Cyclohexanone solution of epoxy-group-containing acrylic rubber (product of Nagase Chemtex Corporation, weight average molecular weight: 800,000, epoxy group content: 5 mass %)
[2]Phenyl glycidyl ether acrylate toluene diisocyanate urethane prepolymer (AT-600, product of Kyoeisha Chemical Co., Ltd.)
[3]Pentaerythritol triacrylate hexamethylene diisocyanate urethane prepolymer (UA-306H, product of Kyoeisha Chemical Co., Ltd.)
[4]Pentaerythritol triacrylate isophorone diisocyanate urethane prepolymer (UA-306I, product of Kyoeisha Chemical Co., Ltd.)
[5]Dipentaerythritol pentaacrylate hexamethylene diisocyanate urethane prepolymer (UA-510H, product of Kyoeisha Chemical Co., Ltd.)
[6]NK Oligo U-412A, product of Shin-Nakamura Chemical Co., Ltd.
[7]NK Oligo UA-6100, product of Shin-Nakamura Chemical Co., Ltd.
[8]NK Oligo UA-160TM, product of Shin-Nakamura Chemical Co., Ltd.
[9]UF-8001, product of Kyoeisha Chemical Co., Ltd.
[10]Trimethylolpropane triacrylate (Light Acrylate TMP-A, product of Kyoeisha Chemical Co., Ltd.)
[11]Bis(2,4,6-trimethylbenzoyl)phenylphosphine oxide (product of Ciba Specialty Chemicals)
[12]1-[4-(2-Hydroxyethoxy)phenyl]-2-hydroxy-2-methyl-1-propane-1-one (product of Ciba Specialty Chemicals)
[13]AA: 90% or more, BB: 70% or more and less than 90%, CC: 50% or more and less than 70%, and DD: less than 50%, as determined at a film thickness of 110 μm
[14]AA: 10% or less, BB: more than 10% and 20% or less, CC: more than 20% and 30% or less, and DD: more than 30%, as determined at a film thickness of 110 μm Synthesis Example 1

Synthesis of Urethane Acrylate A

Air was fed to a 2 L three-necked flask equipped with a stirrer, a thermometer, a condenser, and an air inlet tube, and then polytetramethylene glycol (trade name: PTG850SN, product of Hodogaya Chemical Co., Ltd.) (520.8 g), diethylene glycol (1.06 g), unsaturated fatty acid hydroxyalkyl ester-modified ε-caprolactone (trade name: FA2D, product of Daicel Chemical Industries, Ltd.) (275.2 g), p-methoxyquinone (0.5 g) serving as a polymerization inhibitor, and dibutyltin dilaurate (trade name: L101, product of Tokyo Fine Chemical Co., Ltd.) (0.3 g) serving as a catalyst were added to the flask and heated to 70° C. Thereafter, isophorone diisocyanate (trade name: Desmodur I, product of Sumika Bayer Urethane Co., Ltd.) (222 g) was uniformly added dropwise to the flask over two hours under stirring at 70 to 75° C., to thereby allow reaction to proceed. After completion of dropwise addition, reaction was allowed to proceed for about five hours and then stopped. The weight average molecular weight of the resultant product (as reduced to standard polystyrene) was determined by means of GPC(SD-8022/DP-8020/RI-8020, product of Tosoh Corporation). Thus, urethane acrylate A having a weight average molecular weight of 10,000 was produced.

Example 9

Preparation of Cladding-Layer-Forming Resin Varnish CLV-9

The following components (A) to (D) were mixed under stirring: (A) a (meth)acrylic polymer; specifically, a cyclohexanone solution of epoxy-group-containing acrylic rubber (HTR-860P-3, product of Nagase ChemteX Corporation, weight average molecular weight: 800,000, solid content: 12 mass %) (500 parts by mass (solid content: 60 parts by mass)); (B) a urethane (meth)acrylate; specifically, urethane acrylate A produced in Synthesis Example 1 (20 parts by mass); (C) a (meth)acrylate; specifically, trimethylolpropane triacrylate (TMP-A, product of KYOEISHA Chemical Co., Ltd.) (20 parts by mass); and (D) photoradical polymerization initiators; specifically, bis(2,4,6-trimethylbenzoyl)phenylphosphine oxide (Irgacure 819, product of Ciba Specialty Chemicals) (1 part by mass), and 1-[4-(2-hydroxyethoxy)phenyl]-2-hydroxy-2-methyl-1-propane-1-one (Irgacure 2959, product of Ciba Specialty Chemicals) (1 part by mass). Thereafter, the resultant mixture was defoamed under reduced pressure, to thereby prepare cladding-layer-forming resin varnish CLV-9.

[Production of Cladding-Layer-Forming Resin Film CLF-9]

Cladding-layer-forming resin varnish CLV-9 was applied to a non-treated surface of a mold-release-treated PET film (A4100, product of Toyobo Co., Ltd., thickness: 50 μm) by means of a coating machine (Multicoater TM-MC, product of Hirano Tecseed Co., Ltd.), followed by drying at 100° C. for 20 minutes. Subsequently, a mold-release-treated PET film (A31, product of Teijin DuPont Films, thickness: 25 μm) serving as a protective film was attached to the resin-coated PET film, to thereby produce cladding-layer-forming resin film CLF-9. The thickness of the resin layer may be optionally adjusted by regulating the gap of the coating machine employed. In Example 9, the thickness of the resin layer was adjusted so as to attain a thickness after curing of: 20 μm for a lower-cladding-layer-forming resin film; 90 μm for an upper-cladding-layer-forming resin film; or 50 μm for a cured film for measurement of refractive index.

[Production of Cured Film for Tensile Test, Folding-Type Bending Durability Test, Slide-Type Bending Durability Test, Measurement of Refractive Index, Twisting Durability Test, Measurement of Total Transmittance, and Measurement of Haze]

By means of a roll laminator (HLM-1500, product of Hitachi Chemical Techno Plant Co., Ltd.), lower-cladding-layer-forming resin film CLF-9 (thickness: 20 μm) from which the protective film (A31) had been removed was laminated, at 0.2 MPa, 50° C., and 0.4 m/min, on upper-cladding-layer-forming resin film CLF-9 (thickness: 90 μm) from which the protective film (A31) had been removed. Subsequently, the resultant product was irradiated with UV rays (wavelength: 365 nm, 4,000 mJ/cm$^2$) by means of a UV-ray irradiator (MAP-1200-L, product of Dainippon Screen Mfg. Co., Ltd.). After curing at 160° C. for one hour, the support film (A4100) was removed, to thereby produce a cured film having a thickness of 110 μm.

[Preparation of Core-Forming Resin Varnish COV-2]

The following components were mixed under stirring: a binder polymer; specifically, a propylene glycol monomethyl ether acetate solution of phenoxy resin (YP-70, product of Tohto Kasei Co., Ltd., solid content: 40 mass %) (75 parts by mass (solid content: 30 parts by mass)); polymerizable compounds; specifically, a propylene glycol monomethyl ether acetate solution of ethoxylated fluorene diacrylate (A-BPEF/

PGMAC70, product of Shin-Nakamura Chemical Co., Ltd., solid content: 70 mass %) (29 parts by mass (solid content: 20 parts by mass)), bisphenol A epoxy acrylate (EA-1020, product of Shin-Nakamura Chemical Co., Ltd.) (20 parts by mass), and ethylene oxide (EO) chain-containing bisphenol A acrylate (FA-321A, product of Hitachi Chemical Company, Ltd.) (30 parts by mass); and photoradical polymerization initiators; specifically, 1-[4-(2-hydroxyethoxy)phenyl]-2-hydroxy-2-methyl-1-propane-1-one (Irgacure 2959, product of Ciba Specialty Chemicals) (1 part by mass) and bis(2,4,6-trimethylbenzoyl)phenylphosphine oxide (Irgacure 819, product of Ciba Specialty Chemicals) (1 part by mass). Thereafter, the resultant mixture was defoamed under reduced pressure, to thereby prepare core-forming resin varnish COV-2.

[Production of Core-Forming Resin Film COF-2]

The production process for core-forming resin film COF-1 was repeated, except that core-forming resin varnish COV-1 was replaced with core-forming resin varnish COV-2, to thereby produce core-forming resin film COF-2.

[Production of Cured Film for Measurement of Refractive Index]

Core-forming resin film COF-2 was irradiated with UV rays (wavelength: 365 nm, 2,000 mJ/cm$^2$) by means of a UV-ray irradiator (MAP-1200-L, product of Dainippon Screen Mfg. Co., Ltd.). The protective film (A31) was removed, and, after thermal treatment at 160° C. for one hour, the support film (A1517) was removed, to thereby produce a cured film having a thickness of 50 μm (refractive index at 25° C. and 830 nm: 1.570). The refractive index of the film was determined in a manner similar to that described above.

[Production of Optical Waveguide]

Lower-cladding-layer-forming resin film CLF-9 was irradiated with UV rays (wavelength: 365 nm, 4,000 mJ/cm$^2$) by means of the aforementioned UV-ray irradiator. The protective film (A31) was removed, to thereby form a lower cladding layer.

Subsequently, by means of the aforementioned roll laminator, core-forming resin film COF-2 from which the protective film (A31) had been removed was laminated on the lower cladding layer at 0.4 MPa, 80° C., and 0.4 m/min. Furthermore, the resin film was press-bonded to the cladding layer by means of a vacuum-pressure laminator (MVLP-500/600, product of Meiki Co., Ltd.) under the following conditions: pressure: 0.4 MPa, temperature: 80° C., pressurization time: 30 seconds.

Thereafter, the resultant product was irradiated, via a negative photomask (width: 70 μm), with UV rays (wavelength: 365 nm, 500 mJ/cm$^2$) by means of the aforementioned UV-ray irradiator, and then exposure was carried out at 80° C. for five minutes, followed by heating. The support film (A1517) was removed, and the core portion was developed with a developer (propylene glycol monomethyl ether acetate/N,N-dimethylacetamide=70/30 by mass). Thereafter, the resultant product was washed with propylene glycol monomethyl ether and then isopropanol, and dried under heating at 100° C. for 10 minutes.

Subsequently, upper-cladding-layer-forming resin film CLF-9 from which the protective film (A31) had been removed was laminated on the core portion and the lower cladding layer by means of the aforementioned vacuum-pressure laminator under the following conditions: pressure: 0.4 MPa, temperature: 120° C., pressurization time: 30 seconds. The resin film was irradiated with UV rays (wavelength: 365 nm, 4,000 mJ/cm$^2$), followed by curing at 160° C. for one hour, to thereby form an upper cladding layer.

Then, the support film (A4100) was removed from each of upper- and lower-cladding-layer-forming resin films CLF-9. Thereafter, by means of a dicing saw (DAD-341, product of Disco. Corporation), the resultant product was cut into optical waveguides each having a waveguide length of 10 cm.

Synthesis Example 2

Synthesis of Acrylic-Modified Acrylic Rubber

Acrylic rubber (HTR-860P-3-T10, product of Nagase ChemteX Corporation, cyclohexane solution, NV: 14.9%, glycidyl methacrylate copolymerization ratio: 10 mass %) (100 g), toluene (100 g), methoxyhydroquinone (44 mg), and acrylic acid (6.96 g) were added to a four-necked flask equipped with a mechanical stirrer, a condenser, and a thermometer, and the mixture was stirred at 80° C. with air bubbling. Triphenylphosphine (134 mg) was added to the flask, and the resultant mixture was heated to 110° C. and stirred for six hours. Thereafter, the resultant reaction mixture was added dropwise to methanol (500 g), and the resultant precipitate was washed with methanol. The precipitate was dried in a vacuum oven at 30° C. for 12 hours, to thereby yield a yellow acrylic-modified acrylic rubber product (13 g). The acrylic-modified acrylic rubber was dissolved in cyclohexanone, to thereby prepare a varnish (solid content (NV): 15 mass %).

Examples 10 to 21

Cladding-layer-forming resin varnishes CLV-10 to 21 were prepared according to formulations shown in Table 2, and cladding-layer-forming resin films CLF-10 to 21 were produced in a manner similar to that described in Example 9. Table 2 shows the results of tensile test, folding-type bending durability test, slide-type bending durability test, measurement of refractive index, twisting durability test, measurement of total transmittance, and measurement of haze on the thus-produced cured films.

Subsequently, optical waveguides were produced by use of cladding-layer-forming resin films CLF-10 to 21 in a manner similar to that described in Example 9.

TABLE 2

| | Items | | Ex. 9 CLV-9 (CLF-9) | Ex. 10 CLV-10 (CLF-10) | Ex. 11 CLV-11 (CLF-11) | Ex. 12 CLV-12 (CLF-12) | Ex. 13 CLV-13 (CLF-13) | Ex. 14 CLV-14 (CLF-14) | Ex. 15 CLV-15 (CLF-15) |
|---|---|---|---|---|---|---|---|---|---|
| Components (parts by mass) | (A) | HTR-860P-3 solution*[1] (solid content: 12 mass %) | 500 (solid content: 60) | 500 (solid content: 60) | 500 (solid content: 60) | 500 (solid content: 60) | 500 (solid content: 60) | 500 (solid content: 60) | 417 (solid content: 50) |
| | | Low-molecular-weight product 1 of HTR-860P-3*[15] | — | — | — | — | — | — | — |
| | | Low-molecular-weight product 2 of HTR-860P-3*[16] | — | — | — | — | — | — | — |

TABLE 2-continued

|  |  |  | | | | | | | |
|---|---|---|---|---|---|---|---|---|---|
|  | Acrylic-modified acrylic rubber solution*21 (solid content: 15 mass %) |  | — | — | — | — | — | — | — |
|  | (B) | UA-160TM*8 | — | 20 | — | 20 | 20 | — | — |
|  |  | Urethane Acrylate A*17 | 20 | — | 20 | — | — | 20 | 20 |
|  | (C) | TMP-A*10 | 20 | — | — | — | — | — | — |
|  |  | A-9300** | — | 20 | 20 | — | — | — | — |
|  |  | A-9300-3CL*19 | — | — | — | 20 | — | — | — |
|  |  | DPE-6A*20 | — | — | — | — | 20 | 20 | 30 |
|  | (D) | Irgacure 819*11 | 1 | 1 | 1 | 1 | 1 | 1 | 1 |
|  |  | Irgacure 2959*12 | 1 | 1 | 1 | 1 | 1 | 1 | 1 |
| Evaluations | Tensile modulus (MPa) |  | 278 | 239 | 241 | 135 | 283 | 248 | 245 |
|  | Percent elongation at break (%) |  | 109 | 138 | 178 | 197 | 48 | 60 | 10 |
|  | Folding-type bending durability test |  | No breakage after 1,000,000 repetitions | No breakage after 1,000,000 repetitions | No breakage after 1,000,000 repetitions | No breakage after 1,000,000 repetitions | No breakage after 1,000,000 repetitions | No breakage after 1,000,000 repetitions | No breakage after 500,000 repetitions |
|  | Twisting durability test |  | No breakage after 1,000,000 repetitions | No breakage after 1,000,000 repetitions | No breakage after 1,000,000 repetitions | No breakage after 1,000,000 repetitions | No breakage after 1,000,000 repetitions | No breakage after 1,000,000 repetitions | No breakage after 100,000 repetitions |
|  | Slide-type bending durability test |  | No breakage after 1,000,000 repetitions | No breakage after 1,000,000 repetitions | No breakage after 1,000,000 repetitions | No breakage after 1,000,000 repetitions | No breakage after 1,000,000 repetitions | No breakage after 1,000,000 repetitions | No breakage after 100,000 repetitions |
|  | Refractive index |  | 1.488 | 1.501 | 1.500 | 1.486 | 1.500 | 1.500 | 1.500 |
|  | Total transmittance (%)*13 |  | AA | AA | AA | AA | AA | AA | AA |
|  | Haze (%)*14 |  | AA | AA | AA | AA | AA | AA | AA |

|  |  | Items | Ex. 16 CLV-16 (CLF-16) | Ex. 17 CLV-17 (CLF-17) | Ex. 18 CLV-18 (CLF-18) | Ex. 19 CLV-19 (CLF-19) | Ex. 20 CLV-20 (CLF-20) | Ex. 21 CLV-21 (CLF-21) |
|---|---|---|---|---|---|---|---|---|
| Components (parts by mass) | (A) | HTR-860P-3 solution*1 (solid content: 12 mass %) | 583 (solid content: 70) | 500 (solid content: 60) | 500 (solid content: 60) | — | — | — |
|  |  | Low-molecular-weight product 1 of HTR-860P-3*15 | — | — | — | 60 | — | — |
|  |  | Low-molecular-weight product 2 of HTR-860P-3*16 | — | — | — | — | 60 | — |
|  |  | Acrylic-modified acrylic rubber solution*21 (solid content: 15 mass %) | — | — | — | — | — | 400 (solid content: 60) |
|  | (B) | UA-160TM*8 | — | — | — | — | — | — |
|  |  | Urethane Acrylate A*17 | 15 | 10 | 25 | 20 | 20 | 20 |
|  | (C) | TMP-A*10 | — | — | — | — | — | — |
|  |  | A-9300** | — | — | — | — | — | — |
|  |  | A-9300-3CL*19 | — | — | — | — | — | — |
|  |  | DPE-6A*20 | 15 | 30 | 15 | 20 | 20 | 20 |
|  | (D) | Irgacure 819*11 | 1 | 1 | 1 | 1 | 1 | 1 |
|  |  | Irgacure 2959*12 | 1 | 1 | 1 | 1 | 1 | 1 |
| Evaluations | Tensile modulus (MPa) |  | 214 | 556 | 142 | 246 | 236 | 222 |
|  | Percent elongation at break (%) |  | 125 | 26 | 131 | 62 | 83 | 69 |
|  | Folding-type bending durability test |  | No breakage after 1,000,000 repetitions | No breakage after 500,000 repetitions | No breakage after 1,000,000 repetitions | No breakage after 1,000,000 repetitions | No breakage after 1,000,000 repetitions | Breakage after 100,000 repetitions |
|  | Twisting durability test |  | No breakage after 500,000 repetitions | No breakage after 500,000 repetitions | No breakage after 100,000 repetitions | No breakage after 500,000 repetitions | No breakage after 500,000 repetitions | Breakage after 100,000 repetitions |
|  | Slide-type bending durability test |  | No breakage after 500,000 repetitions | No breakage after 100,000 repetitions | No breakage after 100,000 repetitions | No breakage after 100,000 repetitions | No breakage after 100,000 repetitions | Breakage after 100,000 repetitions |

TABLE 2-continued

| Refractive index | 1.492 | 1.500 | 1.490 | 1.497 | 1.499 | 1.490 |
| Total transmittance (%)[*13] | AA | AA | AA | AA | AA | AA |
| Haze (%)[*14] | AA | AA | AA | AA | AA | AA |

[*1] Cyclohexanone solution of epoxy-group-containing acrylic rubber (product of Nagase Chemtex Corporation, weight average molecular weight: 800,000, epoxy group content: 5 mass %)
[*8] NK Oligo UA-160TM, product of Shin-Nakamura Chemical Co., Ltd.
[*10] Trimethylolpropane triacrylate (Light Acrylate TMP-A, product of Kyoeisha Chemical Co., Ltd.)
[*11] Bis(2,4,6-trimethylbenzoyl)phenylphosphine oxide (product of Ciba Specialty Chemicals)
[*12] 1-[4-(2-Hydroxyethoxy)phenyl]-2-hydroxy-2-methyl-1-propane-1-one (product of Ciba Specialty Chemicals)
[*13] AA: 90% or more, BB: 70% or more and less than 90%, CC: 50% or more and less than 70%, and DD: less than 50%, as determined at a film thickness of 110 μm
[*14] AA: 10% or less, BB: more than 10% and 20% or less, CC: more than 20% and 30% or less, and DD: more than 30%, as determined at a film thickness of 110 μm
[*15] Low-molecular-weight product of epoxy-group-containing acrylic rubber (HTR-860P-3) (product of Nagase Chemtex Corporation, weight average molecular weight: 243,000, epoxy group content: 5 mass %)
[*16] Low-molecular-weight product of epoxy-group-containing acrylic rubber (HTR-860P-3) (product of Nagase Chemtex Corporation, weight average molecular weight: 110,000, epoxy group content: 5 mass %)
[*17] Urethane acrylate A produced in Synthesis Example 1
[*18] NK Oligo A-9300, product of Shin-Nakamura Chemical Co., Ltd.
[*19] NK Oligo A-9300-3CL, product of Shin-Nakamura Chemical Co., Ltd.
[*20] Dipentaerythritol hexaacrylate (DPE-6A, product of Kyoeisha Chemical Co., Ltd.)
[*21] Cyclohexane solution of acrylic-modified acrylic rubber produced in Synthesis Example 2 (weight average molecular weight: 700,000, epoxy group content: 7 mass %, acryloyl group content: 3 mass %)

Example 22

Preparation of Cladding-Layer-Forming Resin Varnish CLV-22

The following components (A) to (E) were mixed under stirring: (A) a (meth)acrylic polymer; specifically, a cyclohexanone solution of epoxy-group-containing acrylic rubber (HTR-860P-3, product of Nagase ChemteX Corporation, weight average molecular weight: 800,000, solid content: 12 mass %) (500 parts by mass (solid content: 60 parts by mass)); (B) a urethane (meth)acrylate; specifically, urethane acrylate A produced in Synthesis Example 1 (20 parts by mass); (C) (meth)acrylates; specifically, dipentaerythritol hexaacrylate (DPE-6A, product of KYOEISHA Chemical Co., Ltd.) (15 parts by mass), and 2,2,2-triacryloyloxymethylethyl succinate (NK Ester CBX-0, product of Shin-Nakamura Chemical Co., Ltd.) (5 parts by mass); (D) photoradical polymerization initiators; specifically, bis(2,4,6-trimethylbenzoyl)phenylphosphine oxide (Irgacure 819, product of Ciba Specialty Chemicals) (1 part by mass), and 1-[4-(2-hydroxyethoxy)phenyl]-2-hydroxy-2-methyl-1-propane-1-one (Irgacure 2959, product of Ciba Specialty Chemicals) (1 part by mass); and (E) a curing promoter; specifically, 1-cyanoethyl-2-phenylimidazole (2PZ-CN, product of Shikoku Chemicals Corporation) (0.3 parts by mass). Thereafter, the resultant mixture was defoamed under reduced pressure, to thereby prepare cladding-layer-forming resin varnish CLV-22.

[Production of Cladding-Layer-Forming Resin Film CLF-22]

Cladding-layer-forming resin varnish CLV-22 was applied to a non-treated surface of a mold-release-treated PET film (A4100, product of Toyobo Co., Ltd., thickness: 50 μm) by means of a coating machine (Multicoater TM-MC, product of Hirano Tecseed Co., Ltd.), followed by drying at 100° C. for 20 minutes. Subsequently, a mold-release-treated PET film (A31, product of Teijin DuPont Films, thickness: 25 μm) serving as a protective film was attached to the resin-coated PET film, to thereby produce cladding-layer-forming resin film CLF-22. The thickness of the resin layer may be optionally adjusted by regulating the gap of the coating machine employed. In Example 22, the thickness of the resin layer was adjusted so as to attain a thickness after curing of: 20 μm for a lower-cladding-layer-forming resin film; 90 μm for an upper-cladding-layer-forming resin film; or 50 μm for a cured film for measurement of refractive index.

[Production of Cured Film for Tensile Test, Folding-Type Bending Durability Test, Slide-Type Bending Durability Test, Measurement of Refractive Index, Twisting Durability Test, Measurement of Total Transmittance, and Measurement of Haze]

By means of a roll laminator (HLM-1500, product of Hitachi Chemical Techno Plant Co., Ltd.), lower-cladding-layer-forming resin film CLF-22 (thickness: 20 μm) from which the protective film (A31) had been removed was laminated, at 0.2 MPa, 50° C., and 0.4 m/min, on upper-cladding-layer-forming resin film CLF-22 (thickness: 90 μm) from which the protective film (A31) had been removed. Subsequently, after curing at 140° C. for one hour, the resultant product was irradiated with UV rays (wavelength: 365 nm, 4,000 mJ/cm$^2$) by means of a UV-ray irradiator (MAP-1200-L, product of Dainippon Screen Mfg. Co., Ltd.). Thereafter, curing was carried out at 160° C. for one hour, and the support film (A4100) was removed, to thereby produce a cured film having a thickness of 110 μm.

[Production of Optical Waveguide]

Lower-cladding-layer-forming resin film CLF-22 was cured under heating at 140° C. for one hour, and then irradiated with UV rays (wavelength: 365 nm, 4,000 mJ/cm$^2$) by means of the aforementioned UV-ray irradiator. The protective film (A31) was removed, to thereby form a lower cladding layer.

Subsequently, by means of the aforementioned roll laminator, core-forming resin film COF-2 from which the protective film (A31) had been removed was laminated on the lower cladding layer at 0.4 MPa, 80° C., and 0.4 m/min. Furthermore, the resin film was press-bonded to the cladding layer by means of a vacuum-pressure laminator (MVLP-500/600, product of Meiki Co., Ltd.) under the following conditions: pressure: 0.4 MPa, temperature: 80° C., pressurization time: 30 seconds.

Thereafter, the resultant product was irradiated, via a negative photomask (width: 70 μm), with UV rays (wavelength: 365 nm, 500 mJ/cm$^2$) by means of the aforementioned UV-ray irradiator, and then exposure was carried out at 80° C. for five minutes, followed by heating. The support film (A1517) was removed, and the core portion was developed with a developer (propylene glycol monomethyl ether acetate/N,N-dimethylacetamide=70/30 by mass). Thereafter, the resultant product was washed with propylene glycol monomethyl ether and then isopropanol, and dried under heating at 100° C. for 10 minutes.

Subsequently, upper-cladding-layer-forming resin film CLF-22 from which the protective film (A31) had been removed was laminated on the core portion and the lower cladding layer by means of the aforementioned vacuum-pressure laminator under the following conditions: pressure: 0.4 MPa, temperature: 120° C., pressurization time: 30 seconds. The resin film was cured under heating at 140° C. for one hour, and then irradiated with UV rays (wavelength: 365 nm, 4,000 mJ/cm$^2$), followed by curing at 160° C. for one hour, to thereby form an upper cladding layer.

Then, the support film (A4100) was removed from each of upper- and lower-cladding-layer-forming resin films CLF-22. Thereafter, by means of a dicing saw (DAD-341, product of Disco Corporation), the resultant product was cut into optical waveguides each having a waveguide length of 10 cm.

Examples 23 to 25

Cladding-layer-forming resin varnishes CLV-23 to 25 were prepared according to formulations shown in Table 3, and cladding-layer-forming resin films CLF-23 to 25 were produced in a manner similar to that described in Example 22. Table 3 shows the results of tensile test, folding-type bending durability test, slide-type bending durability test, measurement of refractive index, twisting durability test, measurement of total transmittance, and measurement of haze on the thus-produced cured films.

Subsequently, optical waveguides were produced by use of cladding-layer-forming resin films CLF-23 to 25 in a manner similar to that described in Example 22.

Synthesis Example 3

Preparation of (Meth)acrylic Polymer A

Propylene glycol monomethyl ether acetate (51 parts by mass) was added to a flask equipped with a stirrer, a condenser, a gas inlet tube, a dropping funnel, and a thermometer, and stirring was initiated while nitrogen gas was fed to the flask. The liquid was heated to 65° C., and a mixture of dicyclopentanyl acrylate (25 parts by mass), methyl methacrylate (40 parts by mass), butyl acrylate (15 parts by mass), 2-hydroxyethyl methacrylate (20 parts by mass), 2,2'-azobis(2,4-dimethylvaleronitrile) (2 parts by mass), and propylene glycol monomethyl ether acetate (51 parts by mass) was added dropwise to the flask over three hours. Thereafter, the resultant mixture was stirred at 65° C. for three hours and then stirred at 95° C. for one hour, followed by cooling to room temperature.

Subsequently, dibutyltin dilaurate (0.09 parts by mass), 2,6-di-t-butyl-4-methylphenol (0.1 parts by mass), and propylene glycol monomethyl ether acetate (23 parts by mass) were added to the flask, and stirring was initiated while air was fed thereto. The resultant mixture was heated to 50° C., and then 2-methacryloyloxyethyl isocyanate (23 parts by mass) was added dropwise to the mixture over 30 minutes, followed by stirring at 50° C. for three hours, to thereby yield (meth)acrylic polymer A solution (solid content: 50 mass %).

The weight average molecular weight of (meth)acrylic polymer A (as reduced to standard polystyrene) was deter-

TABLE 3

| | Items | | Example 22 CLV-22 (CLF-22) | Example 23 CLV-23 (CLF-23) | Example 24 CLV-24 (CLF-24) | Example 25 CLV-25 (CLF-25) |
|---|---|---|---|---|---|---|
| Components (parts by mass) | (A) | HTR-860P-3 solution*[1] (solid content: 12 mass %) | 500 (solid content: 60) | 500 (solid content: 60) | — | — |
| | | Epoxy-extended HTR-860P-3*[22] | — | — | 60 | 60 |
| | (B) | Urethane Acrylate A*[17] | 20 | 20 | 20 | 20 |
| | (C) | DPE-6A*[20] | 15 | 15 | 13 | 7 |
| | | HOA-HH*[23] | — | 5 | — | — |
| | | CBX-0*[24] | 5 | — | 7 | 13 |
| | (D) | Irgacure 819*[11] | 1 | 1 | 1 | 1 |
| | | Irgacure 2959*[12] | 1 | 1 | 1 | 1 |
| | (E) | 2PZ-CN*[25] | 0.3 | 0.3 | 0.3 | 1 |
| Evaluations | | Tensile modulus (MPa) | 456 | 455 | 310 | 521 |
| | | Percent elongation at break (%) | 48 | 10 | 34 | 17 |
| | | Folding-type bending durability test | No breakage after 1,000,000 repetitions | No breakage after 1,000,000 repetitions | No breakage after 1,000,000 repetitions | No breakage after 1,000,000 repetitions |
| | | Twisting durability test | No breakage after 800,000 repetitions | No breakage after 1,000,000 repetitions | No breakage after 1,000,000 repetitions | No breakage after 1,000,000 repetitions |
| | | Slide-type bending durability test | No breakage after 1,000,000 repetitions | No breakage after 1,000,000 repetitions | No breakage after 1,000,000 repetitions | No breakage after 1,000,000 repetitions |
| | | Refractive index | 1.490 | 1.489 | 1.497 | 1.498 |
| | | Total transmittance (%)*[13] | AA | AA | AA | AA |
| | | Haze (%)*[14] | AA | AA | AA | AA |

*[1]Cyclohexanone solution of epoxy-group-containing acrylic rubber (product of Nagase Chemtex Corporation, weight average molecular weight: 800,000, epoxy group content: 5 mass %)
*[11]Bis(2,4,6-trimethylbenzoyl)phenylphosphine oxide (product of Ciba Specialty Chemicals)
*[12]1-[4-(2-Hydroxyethoxy)phenyl]-2-hydroxy-2-methyl-1-propane-1-one (product of Ciba Specialty Chemicals)
*[13]AA: 90% or more, BB: 70% or more and less than 90%, CC: 50% or more and less than 70%, and DD: less than 50%, as determined at a film thickness of 110 μm
*[14]AA: 10% or less, BB: more than 10% and 20% or less, CC: more than 20% and 30% or less, and DD: more than 30%, as determined at a film thickness of 110 μm
*[17]Urethane acrylate A produced in Synthesis Example 1
*[20]Dipentaerythritol hexaacrylate (DPE-6A, product of Kyoeisha Chemical Co., Ltd.)
*[22]Epoxy-group-containing acrylic rubber (product of Nagase Chemtex Corporation, weight average molecular weight: 700,000, epoxy group content: 10 mass %)
*[23]2-Acryloyloxyethyl hexahydrophthalate (HOA-HH, product of Kyoeisha Chemical Co., Ltd.)
*[24]2,2,2-Triacryloyloxymethylethyl succinate (NK Ester CBX-0, product of Shin-Nakamura Chemical Co., Ltd.)
*[25]1-Cyanoethyl-2-phenylimidazole (2PZ-CN, product of Shikoku Chemicals Corporation)

mined by means of GPC(SD-8022/DP-8020/RI-8020, product of Tosoh Corporation). As a result, the weight average molecular weight was found to be 40,500. Gelpack GL-A150-S/GL-A160-S (product of Hitachi Chemical Company, Ltd.) was employed as a column.

Synthesis Example 4

Preparation of (Meth)acrylic Polymer B

Propylene glycol monomethyl ether acetate (50 parts by mass) was added to a flask equipped with a stirrer, a condenser, a gas inlet tube, a dropping funnel, and a thermometer, and stirring was initiated while nitrogen gas was fed to the flask. The liquid was heated to 65° C., and a mixture of dicyclopentanyl acrylate (25 parts by mass), methyl methacrylate (40 parts by mass), butyl acrylate (15 parts by mass), 2-hydroxyethyl methacrylate (20 parts by mass), 2,2'-azobis (2,4-dimethylvaleronitrile) (1 part by mass), and propylene glycol monomethyl ether acetate (50 parts by mass) was added dropwise to the flask over three hours. Thereafter, the resultant mixture was stirred at 65° C. for three hours and then stirred at 95° C. for one hour, followed by cooling to room temperature.

Subsequently, dibutyltin dilaurate (0.09 parts by mass), 2,6-di-t-butyl-4-methylphenol (0.1 parts by mass), and propylene glycol monomethyl ether acetate (23 parts by mass) were added to the flask, and stirring was initiated while air was fed thereto. The resultant mixture was heated to 50° C., and then 2-methacryloyloxyethyl isocyanate (23 parts by mass) was added dropwise to the mixture over 30 minutes, followed by stirring at 50° C. for three hours, to thereby yield (meth)acrylic polymer B solution (solid content: 50 mass %).

The weight average molecular weight of (meth)acrylic polymer B was determined in a manner similar to that described in Synthesis Example 3. As a result, the weight average molecular weight was found to be 82,500.

Comparative Example 1

Preparation of Cladding-Layer-Forming Resin Varnish CLV-26

The following components were mixed under stirring: a (meth)acrylic polymer; specifically, (meth)acrylic polymer A produced in Synthesis Example 3 (120 parts by mass (solid content: 60 parts by mass)); (B) a urethane (meth)acrylate; specifically, urethane acrylate A (20 parts by mass); (C) a (meth)acrylate; specifically, dipentaerythritol hexaacrylate (DPE-6A, product of KYOEISHA Chemical Co., Ltd.) (20 parts by mass); and (D) photopolymerization initiators; specifically, bis(2,4,6-trimethylbenzoyl)phenylphosphine oxide (Irgacure 819, product of Ciba Specialty Chemicals) (1 part by mass), and 1-[4-(2-hydroxyethoxy)phenyl]-2-hydroxy-2-methyl-1-propane-1-one (Irgacure 2959, product of Ciba Specialty Chemicals) (1 part by mass). Thereafter, the resultant mixture was defoamed under reduced pressure, to thereby prepare cladding-layer-forming resin varnish CLV-26.

[Production of Cladding-Layer-Forming Resin Film CLF-26]

Cladding-layer-forming resin varnish CLV-26 was applied to a non-treated surface of a mold-release-treated PET film (A4100, product of Toyobo Co., Ltd., thickness: 50 µm) by means of a coating machine (Multicoater TM-MC, product of Hirano Tecseed Co., Ltd.), followed by drying at 100° C. for 20 minutes. Subsequently, a mold-release-treated PET film (A31, product of Teijin DuPont Films, thickness: 25 µm) serving as a protective film was attached to the resin-coated PET film, to thereby produce cladding-layer-forming resin film CLF-26. The thickness of the resin layer may be optionally adjusted by regulating the gap of the coating machine employed. In Comparative Example 1, the thickness of the resin layer was adjusted so as to attain a thickness after curing of: 20 µm for a lower-cladding-layer-forming resin film; 90 µm for an upper-cladding-layer-forming resin film; or 60 µm for a cured film for measurement of refractive index.

[Production of Cured Film for Tensile Test, Folding-Type Bending Durability Test, Slide-Type Bending Durability Test, Measurement of Refractive Index, Twisting Durability Test, Measurement of Total Transmittance, and Measurement of Haze]

By means of a roll laminator (HLM-1500, product of Hitachi Chemical Techno Plant Co., Ltd.), lower-cladding-layer-forming resin film CLF-26 (thickness: 20 µm) from which the protective film (A31) had been removed was laminated, at 0.2 MPa, 50° C., and 0.4 m/min, on upper-cladding-layer-forming resin film CLF-26 (thickness: 90 µm) from which the protective film (A31) had been removed. Subsequently, the resultant product was irradiated with UV rays (wavelength: 365 nm, 4,000 mJ/cm$^2$) by means of a UV-ray irradiator (MAP-1200-L, product of Dainippon Screen Mfg. Co., Ltd.). Thereafter, curing was carried out at 160° C. for one hour, and the support film (A4100) was removed, to thereby produce a cured film having a thickness of 110 µm.

[Production of Optical Waveguide]

Lower-cladding-layer-forming resin film CLF-26 was irradiated with UV rays (wavelength: 365 nm, 4,000 mJ/cm$^2$) by means of the aforementioned UV-ray irradiator. The protective film (A31) was removed, to thereby form a lower cladding layer.

Subsequently, by means of the aforementioned roll laminator, core-forming resin film COF-2 from which the protective film (A31) had been removed was laminated on the lower cladding layer at 0.4 MPa, 80° C., and 0.4 m/min. Furthermore, the resin film was press-bonded to the cladding layer by means of a vacuum-pressure laminator (MVLP-500/600, product of Meiki Co., Ltd.) under the following conditions: pressure: 0.4 MPa, temperature: 80° C., pressurization time: 30 seconds.

Thereafter, the resultant product was irradiated, via a negative photomask (width: 70 µm), with UV rays (wavelength: 365 nm, 500 mJ/cm$^2$) by means of the aforementioned UV-ray irradiator, and then exposure was carried out at 80° C. for five minutes, followed by heating. The support film (A1517) was removed, and the core portion was developed with a developer (propylene glycol monomethyl ether acetate/N,N-dimethylacetamide=70/30 by mass). Thereafter, the resultant product was washed with propylene glycol monomethyl ether and then isopropanol, and dried under heating at 100° C. for 10 minutes.

Subsequently, upper-cladding-layer-forming resin film CLF-26 from which the protective film (A31) had been removed was laminated on the core portion and the lower cladding layer by means of the aforementioned vacuum-pressure laminator under the following conditions: pressure: 0.4 MPa, temperature: 120° C., pressurization time: 30 seconds. The resin film was irradiated with UV rays (wavelength: 365 nm, 4,000 mJ/cm$^2$), followed by curing at 160° C. for one hour, to thereby form an upper cladding layer.

Then, the support film (A4100) was removed from each of upper- and lower-cladding-layer-forming resin films CLF-26. Thereafter, by means of a dicing saw (DAD-341, product of Disco Corporation), the resultant product was cut into optical waveguides each having a waveguide length of 10 cm.

Comparative Examples 2 and 3

Cladding-layer-forming resin varnishes CLV-27 and 28 were prepared according to formulations shown in Table 4, and cladding-layer-forming resin films CLF-27 and 28 were produced in a manner similar to that described in Comparative Example 1. Table 4 shows the results of tensile test, folding-type bending durability test, slide-type bending durability test, measurement of refractive index, twisting durability test, measurement of total transmittance, and measurement of haze on the thus-produced cured films.

Subsequently, optical waveguides were produced by use of cladding-layer-forming resin films CLF-27 and 28 in a manner similar to that described in Comparative Example 1.

TABLE 4

| Items | | Comparative Example 1 CLV-26 (CLF-26) | Comparative Example 2 CLV-27 (CLF-27) | Comparative Example 3 CLV-28 (CLF-28) |
|---|---|---|---|---|
| Components (parts by mass) | (Meth)acrylate polymer A[*26] (solid content: 50 mass %) | 120 (solid content: 60) | — | — |
| | (Meth)acrylate polymer B[*27] (solid content: 50 mass %) | — | 120 (solid content: 60) | — |
| | (A) HTR-860P-3 solution[*1] (solid content: 12 mass %) | — | — | 500 (solid content: 60) |
| | (B) Urethane Acrylate A[*17] | 20 | 20 | — |
| | (C) DPE-6A[*20] | 20 | 20 | 40 |
| | (D) Irgacure 819[*11] | 1 | 1 | 1 |
| | Irgacure 2959[*12] | 1 | 1 | 1 |
| Evaluations | Tensile modulus (MPa) | 1753 | 1558 | 1200 |
| | Percent elongation at break (%) | 6 | 6 | 10 |
| | Folding-type bending durability test | Breakage after 10,000 repetitions | Breakage after 10,000 repetitions | Breakage after 10,000 repetitions |
| | Twisting durability test | Breakage after 10,000 repetitions | Breakage after 10,000 repetitions | Breakage after 10,000 repetitions |
| | Slide-type bending durability test | Breakage after 10,000 repetitions | Breakage after 10,000 repetitions | Breakage after 10,000 repetitions |
| | Refractive index | 1.509 | 1.508 | 1.505 |
| | Total transmittance (%)[*13] | AA | AA | AA |
| | Haze (%)[*14] | AA | AA | AA |

[*1] Cyclohexanone solution of epoxy-group-containing acrylic rubber (product of Nagase Chemtex Corporation, weight average molecular weight: 800,000)
[*11] Bis(2,4,6-trimethylbenzoyl)phenylphosphine oxide (product of Ciba Specialty Chemicals)
[*12] 1-[4-(2-Hydroxyethoxy)phenyl]-2-hydroxy-2-methyl-1-propane-1-one (product of Ciba Specialty Chemicals)
[*13] AA: 90% or more, BB: 70% or more and less than 90%, CC: 50% or more and less than 70%, and DD: less than 50%, as determined at a film thickness of 110 μm
[*14] AA: 10% or less, BB: more than 10% and 20% or less, CC: more than 20% and 30% or less, and DD: more than 30%, as determined at a film thickness of 110 μm
[*17] Urethane acrylate A produced in Synthesis Example 1
[*20] Dipentaerythritol hexaacrylate (DPE-6A, product of Kyoeisha Chemical Co., Ltd.)
[*26] Acrylic polymer A solution produced in Synthesis Example 3
[*27] Acrylic polymer B solution produced in Synthesis Example 4

[Measurement of Light Transmission Loss]

The light transmission loss of each of the optical waveguides (waveguide length: 10 cm) produced in Examples 1 to 25 and Comparative Examples 1 to 3 was measured through the cutback method (waveguide length for measurement: 10, 5, 3, or 2 cm) employing VCSEL (FLS-300-01-VCL, product of EXFO, central wavelength: 850 nm) serving as a light source, a light-receiving sensor (Q82214, product of Advantest Corporation), an incident fiber (GI-50/125 multimode fiber, NA=0.20), and an output fiber (SI-114/125, NA=0.22). AA: 0.1 dB/cm or less; BB: more than 0.1 dB/cm and 0.2 dB/cm or less; CC: more than 0.2 dB/cm and 0.3 dB/cm or less; and DD: more than 0.3 dB/cm.

Each of the above-produced optical waveguides (width: 5 mm, length: 10 mm) was subjected to slide-type bending durability test, folding-type bending durability test, and twisting durability test under the same conditions as those described above. For evaluation of such durability, the optical waveguide was observed every 10,000 repetitions of bending (or twisting) to determine whether or not breakage occurred, and the maximum of bending (or twisting) repetitions at which no breakage was observed was determined.

[Slide-Type Bending Durability Test]

Each of the optical waveguides 1 produced in the Examples and the Comparative Examples (width: 2 mm, length: 50 mm) was subjected to a slide-type bending durability test by means of a slide-type bending durability tester (product of Daisho Denshi Co., Ltd.) shown in FIG. 2. For this test, each of the optical waveguides produced in the Examples and the Comparative Examples (width: 2 mm, length: 50 mm) was placed so that the lower cladding layer faced an axis for bending (virtual axis) 7. The test was carried out under the following conditions: bending radius of curvature (R): 2.0 mm (for Examples 1 to 8) or 1.5 mm (for Examples 9 to 25 and Comparative Examples 1 to 3), slide speed: 80 mm/second, distance between $X^1$ and $X^2$: 20 mm. For evaluation of slide-type bending durability, the optical waveguide was observed every 10,000 repetitions of bending to determine whether or not breakage occurred, and the maximum of bending repetitions at which no breakage was observed was determined.

The thus-obtained results are shown in Tables 5-1 to 5-4.

TABLE 5-1

| | Examples | | | | | | | |
|---|---|---|---|---|---|---|---|---|
| Items | 1 | 2 | 3 | 4 | 5 | 6 | 7 | 8 |
| Light transmission loss[*1] | BB | BB | BB | BB | CC | CC | BB | BB |
| Folding-type bending durability test | No breakage after 500,000 repetitions | No breakage after 500,000 repetitions | No breakage after 500,000 repetitions | No breakage after 500,000 repetitions | No breakage after 500,000 repetitions | No breakage after 500,000 repetitions | No breakage after 500,000 repetitions | No breakage after 500,000 repetitions |
| Twisting durability test | No breakage after 100,000 repetitions | No breakage after 100,000 repetitions | No breakage after 100,000 repetitions | No breakage after 100,000 repetitions | No breakage after 100,000 repetitions | No breakage after 100,000 repetitions | No breakage after 100,000 repetitions | No breakage after 100,000 repetitions |

TABLE 5-1-continued

| Items | Examples | | | | | | | |
|---|---|---|---|---|---|---|---|---|
| | 1 | 2 | 3 | 4 | 5 | 6 | 7 | 8 |
| Slide-type bending durability test | No breakage after 500,000 repetitions | No breakage after 500,000 repetitions | No breakage after 500,000 repetitions | No breakage after 500,000 repetitions | No breakage after 100,000 repetitions | No breakage after 100,000 repetitions | No breakage after 1,000,000 repetitions | No breakage after 1,000,000 repetitions |

TABLE 5-2

| Items | Examples | | | | | | |
|---|---|---|---|---|---|---|---|
| | 9 | 10 | 11 | 12 | 13 | 14 | 15 |
| Light transmission loss*[1] | AA | BB | BB | AA | AA | AA | BB |
| Folding-type bending durability test | No breakage after 1,000,000 repetitions | No breakage after 1,000,000 repetitions | No breakage after 1,000,000 repetitions | No breakage after 1,000,000 repetitions | No breakage after 1,000,000 repetitions | No breakage after 1,000,000 repetitions | No breakage after 100,000 repetitions |
| Twisting durability test | No breakage after 1,000,000 repetitions | No breakage after 1,000,000 repetitions | No breakage after 1,000,000 repetitions | No breakage after 1,000,000 repetitions | No breakage after 1,000,000 repetitions | No breakage after 1,000,000 repetitions | No breakage after 100,000 repetitions |
| Slide-type bending durability test | No breakage after 1,000,000 repetitions | No breakage after 1,000,000 repetitions | No breakage after 1,000,000 repetitions | No breakage after 1,000,000 repetitions | No breakage after 1,000,000 repetitions | No breakage after 1,000,000 repetitions | No breakage after 100,000 repetitions |

| Items | Examples | | | | | |
|---|---|---|---|---|---|---|
| | 16 | 17 | 18 | 19 | 20 | 21 |
| Light transmission loss*[1] | BB | BB | BB | BB | BB | BB |
| Folding-type bending durability test | No breakage after 1,000,000 repetitions | No breakage after 100,000 repetitions | No breakage after 500,000 repetitions | No breakage after 1,000,000 repetitions | No breakage after 1,000,000 repetitions | No breakage after 500,000 repetitions |
| Twisting durability test | No breakage after 100,000 repetitions | No breakage after 100,000 repetitions | No breakage after 100,000 repetitions | No breakage after 500,000 repetitions | No breakage after 500,000 repetitions | Breakage after 100,000 repetitions |
| Slide-type bending durability test | No breakage after 500,000 repetitions | No breakage after 100,000 repetitions | No breakage after 300,000 repetitions | No breakage after 500,000 repetitions | No breakage after 500,000 repetitions | No breakage after 500,000 repetitions |

TABLE 5-3

| Items | Examples | | | |
|---|---|---|---|---|
| | 22 | 23 | 24 | 25 |
| Light transmission loss*[1] | BB | BB | AA | BB |
| Folding-type bending durability test | No breakage after 1,000,000 repetitions | No breakage after 1,000,000 repetitions | No breakage after 1,000,000 repetitions | No breakage after 1,000,000 repetitions |
| Twisting durability test | No breakage after 500,000 repetitions | No breakage after 1,000,000 repetitions | No breakage after 1,000,000 repetitions | No breakage after 1,000,000 repetitions |
| Slide-type bending durability test | No breakage after 1,000,000 repetitions | No breakage after 1,000,000 repetitions | No breakage after 1,000,000 repetitions | No breakage after 1,000,000 repetitions |

TABLE 5-4

| | Comparative Examples | | |
|---|---|---|---|
| Items | 1 | 2 | 3 |
| Light transmission loss*[1] | BB | BB | BB |
| Folding-type bending durability test | Breakage after 10,000 repetitions | Breakage after 10,000 repetitions | Breakage after 10,000 repetitions |
| Twisting durability test | Breakage after 10,000 repetitions | Breakage after 10,000 repetitions | Breakage after 10,000 repetitions |
| Slide-type bending durability test | Breakage after 10,000 repetitions | Breakage after 10,000 repetitions | Breakage after 10,000 repetitions |

*[1]AA: 0.1 dB/cm or less; BB: more than 0.1 dB/cm and 0.2 dB/cm or less; CC: more than 0.2 dB/cm and 0.3 dB/cm or less; and DD: more than 0.3 dB/cm.

Each of the optical waveguides of Examples 1 to 25 exhibited excellent bending durability and twisting durability; i.e., neither cracking nor breakage occurred even after 100,000 repetitions or more of folding-type bending durability testing, twisting durability testing, or slide-type bending durability testing.

In contrast, each of the optical waveguides of Comparative Examples 1 and 2—which includes a cladding layer formed from a composition containing a meth(acrylic) polymer having a molecular weight of 100,000 or less exhibited poor bending durability and twisting durability. Meanwhile, the optical waveguide of Comparative Example 3—which includes a cladding layer formed from a composition not containing (B) urethane acrylate—exhibited poor elongation and low flexibility; i.e., breakage was likely to occur.

As is clear from data shown in Tables 1 to 4, a cured film produced from the cladding-layer-forming resin composition of the present invention exhibits excellent bending durability and twisting durability, and thus an optical waveguide produced from the cured film also exhibits excellent bending durability and twisting durability.

INDUSTRIAL APPLICABILITY

Thus, a cured film produced from the cladding-layer-forming resin composition of the present invention, and an optical waveguide produced from the cured film exhibit excellent bending durability and twisting durability by virtue of the aforementioned structures. Therefore, the cured film and the optical waveguide are applicable to a variety of fields, including optical interconnection.

The invention claimed is:

1. A resin composition for forming a cladding layer of an optical waveguide, which composition comprises (A) a (meth)acrylic polymer having a weight average molecular weight more than 100,000, (B) a urethane (meth)acrylate, (D) a radical polymerization initiator, and optionally contains (C) a (meth)acrylate having no urethane bond in the molecule thereof,
   wherein the total amount of components (B) and (C) incorporated into the composition is 10 to 200 parts by mass with respect to 100 parts by mass of the (meth)acrylic polymer having a weight average molecular weight of more than 100,000 (A); the amount of component (C) is 0 to 500 parts by mass with respect to 100 parts by mass of component (B); and the amount of the radical polymerization initiator (D) is 0.1 to 10 parts by mass with respect to 100 parts by mass in total of components (A), (B), and (C).

2. A resin composition for forming a cladding layer according to claim 1, which composition further contains (C) the (meth)acrylate having no urethane bond in the molecule thereof.

3. A resin composition for forming a cladding layer according to claim 2, wherein the (meth)acrylate (C) includes a (meth)acrylate having a carboxyl group in the molecule thereof.

4. A resin composition for forming a cladding layer of an optical waveguide according to claim 3, which composition further contains (E) a curing accelerator.

5. A resin composition for forming a cladding layer according to claim 4, wherein the amount of the curing accelerator (E) is 0.1 to 10 parts by mass with respect to 100 parts by mass in total of components (A), (B) and (C).

6. A resin film for forming a cladding layer, employing a resin composition for forming a cladding layer as recited in claim 4.

7. An optical waveguide having a lower cladding layer and an upper cladding layer, wherein at least one of the layers is formed from a resin composition for forming a cladding layer as recited in claim 4.

8. An optical module employing an optical waveguide as recited in any of claim 7.

9. A resin film for forming a cladding layer, employing a resin composition for forming a cladding layer as recited in claim 2.

10. An optical waveguide having a lower cladding layer and an upper cladding layer, wherein at least one of the layers is formed from a resin composition for forming a cladding layer as recited in claim 2.

11. An optical module employing an optical waveguide as recited in any of claim 10.

12. A resin composition for forming a cladding layer according to claim 1, wherein the (meth)acrylic polymer having a weight average molecular weight more than 100,000 (A) has a reactive functional group.

13. A resin composition for forming a cladding layer according to claim 1, wherein the (meth)acrylic polymer having a weight average molecular weight more than 100,000 (A) is an epoxy group-containing (meth)acrylic polymer having epoxy group-containing repeating units in amounts of 0.5 to 20 mass %.

14. A resin composition for forming a cladding layer according to claim 1, wherein the (meth)acrylic polymer having a weight average molecular weight more than 100,000 (A) is a (meth)acryloyl-group-containing (meth)acrylic polymer having (meth)acryloyl-group-containing repeating units in amounts of 0.5 to 20 mass %.

15. A resin composition for forming a cladding layer according to claim 1, wherein the urethane (meth)acrylate (B) is produced through reaction between a hydroxyl-group-containing (meth)acrylate and a polyisocyanate.

16. A resin composition for forming a cladding layer according to claim 1, which composition has a property such that when the composition is formed into a film and is cured to form a cured film having a thickness of 110 μm, by irradiating with 4,000 mJ/cm$^2$ UV rays and curing at 160° C. for one hour, the cured film exhibits a tensile modulus at 25° C. of 1 to 2,000 MPa.

17. A resin composition for forming a cladding layer according to claim 1, which composition has a property such that when the composition is formed into a film and is cured to form a cured film having a thickness of 110 μm, by irradiating with 4,000 mJ/cm² UV rays and curing at 160° C. for one hour, the cured film exhibits a tensile elongation at break at 25° C. of 10 to 600%.

18. A resin composition for forming a cladding layer according to claim 1, which composition has a property such that when the composition is formed into a film and is cured to form a cured film having a thickness of 110 μm, by irradiating with 4,000 mJ/cm² UV rays and curing at 160° C. for one hour, the cured film exhibits a haze of 30% or less.

19. A resin composition for forming a cladding layer according to claim 1, which composition has a property such that when the composition is formed into a film and is cured to form a cured film having a thickness of 110 μm, by irradiating with 4,000 mJ/cm² UV rays and curing at 160° C. for one hour, the cured film exhibits no breakage after undergoing 100,000 times of a folding-type bending durability test with a bending radius of curvature of 2 mm.

20. A resin composition for forming a cladding layer according to claim 1, which composition has a property such that when the composition is formed into a film and is cured to form a cured film having a thickness of 110 μm, by irradiating with 4,000 mJ/cm² UV rays and curing at 160° C. for one hour, the cured film exhibits no breakage after undergoing 100,000 times of a twisting durability test.

21. A resin composition for forming a cladding layer according to claim 1, which composition has a property such that when the composition is formed into a film and is cured to form a cured film having a thickness of 110 μm, by irradiating with 4,000 mJ/cm² UV rays and curing at 160° C. for one hour, the cured film exhibits no breakage after undergoing 100,000 times of a slide-type bending durability test with a bending radius of curvature of 1.5 or 2 mm.

22. A resin film for forming a cladding layer, employing a resin composition for forming a cladding layer as recited in claim 1.

23. An optical waveguide having a lower cladding layer and an upper cladding layer, wherein at least one of the layers is formed of a resin film for forming a cladding layer as recited in claim 22.

24. An optical waveguide having a lower cladding layer and an upper cladding layer, wherein at least one of the layers is formed from a resin composition for forming a cladding layer as recited in claim 1.

25. An optical waveguide according to claim 24, which has a core portion between the lower cladding layer and the upper cladding layer, wherein the core portion is formed from a photosensitive resin composition having a refractive index more than the refractive indices of the both cladding layers, and a relative refractive index difference between the core portion and one of the cladding layers of 1 to 10%.

26. An optical module employing an optical waveguide as recited in claim 24.

* * * * *